US012758049B2

(12) United States Patent
Anthony et al.

(10) Patent No.: US 12,758,049 B2
(45) Date of Patent: Oct. 13, 2026

(54) STOWABLE COUNTERTOP COOKING SYSTEM

(71) Applicant: SHARKNINJA OPERATING LLC, Needham, MA (US)

(72) Inventors: Joshua D. Anthony, Billerica, MA (US); Ethan T. Brown, Cambridge, MA (US); Richard Rhys Mathias, Brookline, MA (US); Nicholas Varjabedian, Middleboro, MA (US); Nathaniel R. Lavins, Somerville, MA (US); Ross Richardson, Dover, MA (US); Jack David Clark, Brighton, MA (US); James Richard Potter, Windsor (GB)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 19/559,013

(22) Filed: Mar. 6, 2026

(65) Prior Publication Data

US 2026/0191357 A1 Jul. 9, 2026

Related U.S. Application Data

(63) Continuation of application No. 19/028,825, filed on Jan. 17, 2025, which is a continuation of application
(Continued)

(51) Int. Cl.

| | |
|---|---|
| *A47J 36/34* | (2006.01) |
| *A47J 27/00* | (2006.01) |
| *A47J 37/06* | (2006.01) |

(52) U.S. Cl.
CPC ............ *A47J 36/34* (2013.01); *A47J 27/004* (2013.01); *A47J 37/0635* (2013.01)

(58) Field of Classification Search
CPC ................ A47J 37/0611; A47J 37/0623; A47J 37/0814; A47J 37/08; A47J 37/0807;
(Continued)

(56) References Cited

U.S. PATENT DOCUMENTS

| | | | |
|---|---|---|---|
| 1,559,234 | A | 10/1925 | Fleming |
| 2,041,327 | A | 5/1936 | Fischer |

(Continued)

FOREIGN PATENT DOCUMENTS

| | | | |
|---|---|---|---|
| CA | 2570928 | C | 5/2014 |
| CN | 102449402 | B | 6/2014 |

(Continued)

*Primary Examiner* — Vy T Nguyen
(74) *Attorney, Agent, or Firm* — Mintz, Levin, Cohn, Ferris, Glovsky and Popeo, P.C.

(57) ABSTRACT

A cooking system positionable on a support surface including a housing having an internal heating compartment and an opening formed in said housing for accessing said internal heating compartment. The housing is movable between a first position and second positon. The opening is arranged within a first plane when said housing is in said first position, and the opening is arranged within a second plane when said housing is in said second position, said first plane and said second plane being distinct.

20 Claims, 18 Drawing Sheets

Related U.S. Application Data

No. 16/801,765, filed on Feb. 26, 2020, now Pat. No. 12,232,647.

(60) Provisional application No. 62/810,639, filed on Feb. 26, 2019.

(58) Field of Classification Search

CPC .. A47J 37/0871; A47J 37/0629; A47J 37/041; A47J 37/04; A47J 37/0641; A47J 37/0842; A47J 27/002; A47J 37/00; A47J 37/043; A47J 37/06; A47J 37/0635; A47J 37/0664; A47J 37/0688; A47J 37/0821; A47J 2037/0617; A47J 27/004; A47J 27/14; A47J 36/00; A47J 36/2483; A47J 36/32; A47J 37/042; A47J 37/0658; A47J 37/067; A47J 37/0694; A47J 37/0704; A47J 37/0709; A47J 37/0745; A47J 37/0763; A47J 43/04; A47J 43/046; A47J 2037/0777; A47J 27/00; A47J 27/04; A47J 27/05; A47J 27/122; A47J 29/02; A47J 31/00; A47J 36/165; A47J 36/24; A47J 36/34; A47J 37/015; A47J 37/046; A47J 37/047; A47J 37/0676; A47J 37/0682; A47J 37/0713; A47J 37/0731; A47J 37/0736; A47J 37/0786; A47J 37/0828; A47J 37/085; A47J 37/0857; A47J 37/0878; A47J 37/10; A47J 37/105; A47J 37/108; A47J 37/1219; A47J 37/1242; A47J 37/128; A47J 37/1285; A47J 37/1295; A47J 39/00; A47J 39/006; A47J 39/02; A47J 43/0727; A47J 47/12; A47J 47/14; F24C 15/006; F24C 15/103; F24C 15/30; F24C 15/18; F24C 15/325; F24C 14/02; F24C 15/023; F24C 15/108; F24C 15/16; F24C 15/2014; F24C 7/087; F24C 15/02; F24C 15/024; F24C 15/04; F24C 15/10; F24C 15/101; F24C 15/14; F24C 15/164; F24C 15/2042; F24C 7/067; F24C 1/04; F24C 1/16; F24C 11/00; F24C 14/025; F24C 15/028; F24C 15/2007; F24C 3/027; F24C 3/087; F24C 7/02; F24C 7/06; F24C 7/082; F24C 9/00; A23L 5/15; A23L 5/10; A23L 13/50; A23L 5/11; A23L 5/17; H05B 6/80; H05B 6/1209; H05B 2206/042; H05B 3/74; H05B 6/1263; H05B 6/129; H05B 6/642; H05B 1/02; H05B 2203/013; H05B 3/141; H05B 3/148; H05B 3/265; H05B 3/84; H05B 6/64; H05B 6/6408; H05B 6/6411; H05B 6/6473; H05B 6/6482; H05B 6/687; H05B 6/725; A21B 1/245; A21B 1/06; A21B 1/42; A21B 1/48; A21B 5/023; F24B 1/205

USPC ... 99/339, 391, 329 RT, 340, 327, 357, 385, 99/334, 337, 389, 419, 328, 349, 374, 99/375, 377, 400, 401, 331, 332, 342, 99/372, 378, 379, 380, 395, 421 V, 474, 99/333, 335, 338, 348, 365, 376, 386, 99/390, 399, 407, 421 H, 421 R, 425, 99/427, 443 C, 444, 446, 447, 450, 473, 99/475, 479, 480, 483, 484; 126/21 A, 126/273 R, 19 R, 37 B, 19 M, 21 R, 41 R, 126/211, 273 A, 9 R, 198, 20, 20.1, 126/214 A, 220, 25 R, 29, 332, 37 A, 38, 126/39 BA, 39 G, 39 R, 41 C, 77; 219/400, 386, 452.13, 218, 392, 393, 394, 219/521, 679, 757, 391, 408, 412, 450.1, 219/453.13, 478, 492, 622, 387, 388, 402, 219/405, 411, 429, 438, 451.1, 452.11, 219/453.14, 476, 483, 486, 489, 506, 507, 219/524, 525, 624, 647, 680, 681, 702, 219/720, 725, 756; 312/236, 308, 209, 312/227, 245, 31, 321.5, 322, 327, 350; 426/523, 231, 418

See application file for complete search history.

(56) References Cited

U.S. PATENT DOCUMENTS

| | | | | |
|---|---|---|---|---|
| 2,172,687 | A | 9/1939 | Anderson et al. | |
| 3,750,989 | A | 8/1973 | Bergeson | |
| 3,927,853 | A | 12/1975 | Guth | |
| 4,068,815 | A | 1/1978 | Losert | |
| 4,484,063 | A | 11/1984 | Whittenburg et al. | |
| 5,823,504 | A | 10/1998 | Kuwajima | |
| 5,878,983 | A | 3/1999 | Olson et al. | |
| 6,392,211 | B2 | 5/2002 | Kim et al. | |
| 7,371,999 | B1 | 5/2008 | Douglas et al. | |
| 7,806,114 | B2 | 10/2010 | Lee et al. | |
| 8,294,070 | B2 | 10/2012 | McNamee et al. | |
| 8,740,160 | B2 | 6/2014 | Bevirt | |
| 11,149,958 | B2 | 10/2021 | Klok | |
| 2011/0100352 | A1 * | 5/2011 | Palmeto | F24C 15/30 126/39 BA |
| 2015/0040774 | A1 * | 2/2015 | Fung | A47J 37/0623 219/412 |

FOREIGN PATENT DOCUMENTS

| | | | |
|---|---|---|---|
| CN | 106439933 | A | 2/2017 |
| CN | 108131698 | A | 6/2018 |
| CN | 108361763 | A | 8/2018 |
| CN | 108870486 | A | 11/2018 |
| CN | 110916521 | A | 3/2020 |
| CN | 111503686 | A | 8/2020 |
| CN | 111802906 | B | 5/2021 |
| CN | 114305154 | A | 4/2022 |
| EP | 1010384 | B1 | 10/2004 |
| JP | H06209860 | A | 8/1994 |

* cited by examiner

STOWABLE COUNTERTOP COOKING SYSTEM

CROSS-REFERENCE TO RELATED APPLICATIONS

This application is a continuation of U.S. patent application Ser. No. 19/028,825, filed Jan. 17, 2025, and entitled "STOWABLE COUNTERTOP COOKING SYSTEM," which is a continuation of U.S. patent application Ser. No. 16/801,765, filed Feb. 26, 2020, which issued as U.S. Pat. No. 12,232,647 on Feb. 5, 2025, and which claims priority to U.S. Provisional Patent Application No. 62/810,639, filed Feb. 26, 2019, the entire contents of each of which are hereby incorporated herein by reference.

BACKGROUND

Embodiments of the present disclosure relate generally to a cooking system, and more particularly, to a countertop cooking system having a stowed position that requires minimal counter space.

Existing countertop cooking systems, such as toaster ovens for example, may be used to conveniently warm or cook food in place of a larger wall mounted oven or a range for example. Countertop cooking systems typically cover a substantial amount of counter space. In a kitchen with limited counter space, the space occupied by the countertop cooking system when not in use is inconvenient for the user. As a result, a user may store the countertop cooking system elsewhere, reducing the accessibility and ease of use of the countertop cooking system. It is therefore desirable to develop a countertop cooking system that occupies minimal counter space when not in use.

SUMMARY

According to an embodiment, a cooking system positionable on a support surface including a housing having an internal heating compartment and an opening formed in said housing for accessing said internal heating compartment. The housing is movable between a first position and second position. The opening is arranged within a first plane when said housing is in said first position, and the opening is arranged within a second plane when said housing is in said second position, said first plane and said second plane being distinct.

According to an embodiment, a cooking system mountable on a support surface includes a housing having an internal heating compartment and an opening formed in said housing for accessing said internal heating compartment. A swivel structure is arranged at an exterior of said housing, said swivel structure defining a swivel axis. The housing is rotatable about said swivel axis between a first position and a second position.

According to another embodiment, a cooking system includes a housing having a plurality of sides that define an internal heating compartment, a first opening formed in said housing for accessing said internal heating compartment, and a second opening formed in said housing for accessing said internal heating compartment. The first opening is located at a first side of said plurality of sides, and the second opening being located at a second side of said plurality of sides. A cleaning door is movable relative to said housing to selectively seal said second opening.

According to yet another embodiment, A method of accessing an internal heating compartment of a cooking system includes moving a housing defining the internal heating compartment from a first position to a second position, said housing having a first opening located at a first side of said housing and opening a cleaning door arranged in overlapping arrangement with a second opening located at a second side of said housing to access the internal heating compartment.

According to an embodiment, a cooking system includes a housing having a plurality of sides that define an internal heating compartment and a first opening formed in said housing for accessing said internal heating compartment. The internal heating compartment includes structures positioned and included in said heating compartment to optimize heat distribution therein. The structures include at least one of a reflector, at least one heating element with a varying heat output along a length thereof, and at least one heating element guard with a desirable aperture distribution along a length thereof.

According to yet another embodiment, a method of operating a cooking system includes providing a housing having a plurality of sides that define an internal heating compartment and optimizing heat distribution within said internal heating compartment via one or more structures positioned and included in said heating compartment to optimize heat distribution therein. The structures include at least one of a reflector, at least one heating element with a varying heat output along a length thereof, and at least one heating element guard with a desirable aperture distribution along a length thereof.

BRIEF DESCRIPTION OF THE FIGURES

The accompanying drawings incorporated in and forming a part of the specification embodies several aspects of the present disclosure and, together with the description, serves to explain the principles of the disclosure. In the drawings.

Figure 1:
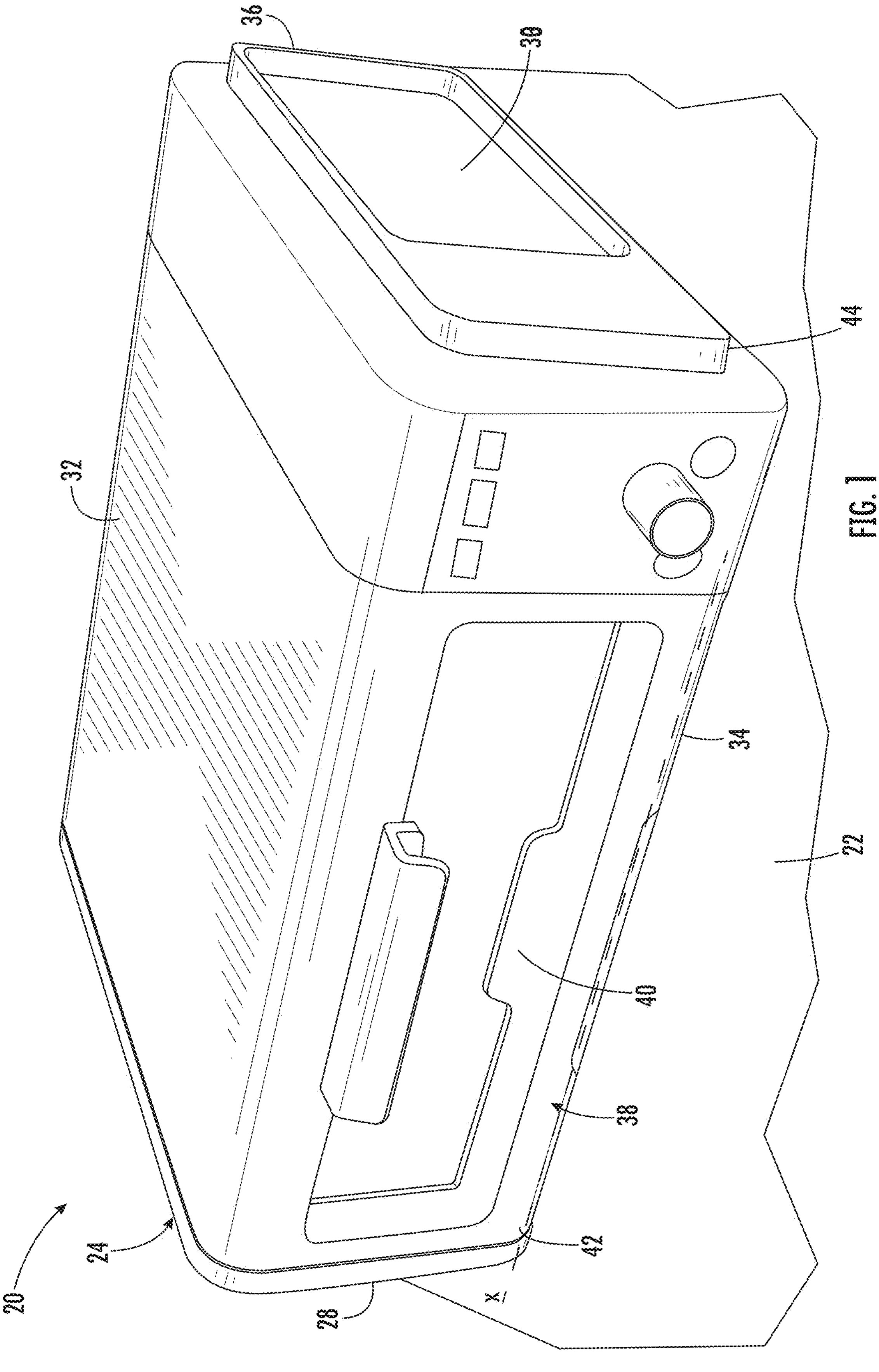
FIG. 1 is a front perspective view of a cooking system according to an embodiment.

The detailed description explains embodiments of the disclosure, together with advantages and features, by way of example with reference to the drawings.

DETAILED DESCRIPTION

With reference now to the FIGS., an example of a cooking system 20 suitable for use on a support surface 22, such as a countertop for example, is illustrated. The cooking system 20 includes a thermally insulated housing 24 that defines an internal heating compartment or cooking volume 26. In the illustrated, non-limiting embodiment, the housing 24 includes a left sidewall 28, a right sidewall 30, a top 32, a bottom 34, and a back or rear wall 36 connected together to define the internal heating compartment 26 there between. In an embodiment, the housing 24 additionally includes a front wall 38 through which the internal heating compartment 26 is accessed by a user. However, it should be understood that embodiments where the housing 24 does not include a front wall 38 are also within the scope of the disclosure.

Figure 2:
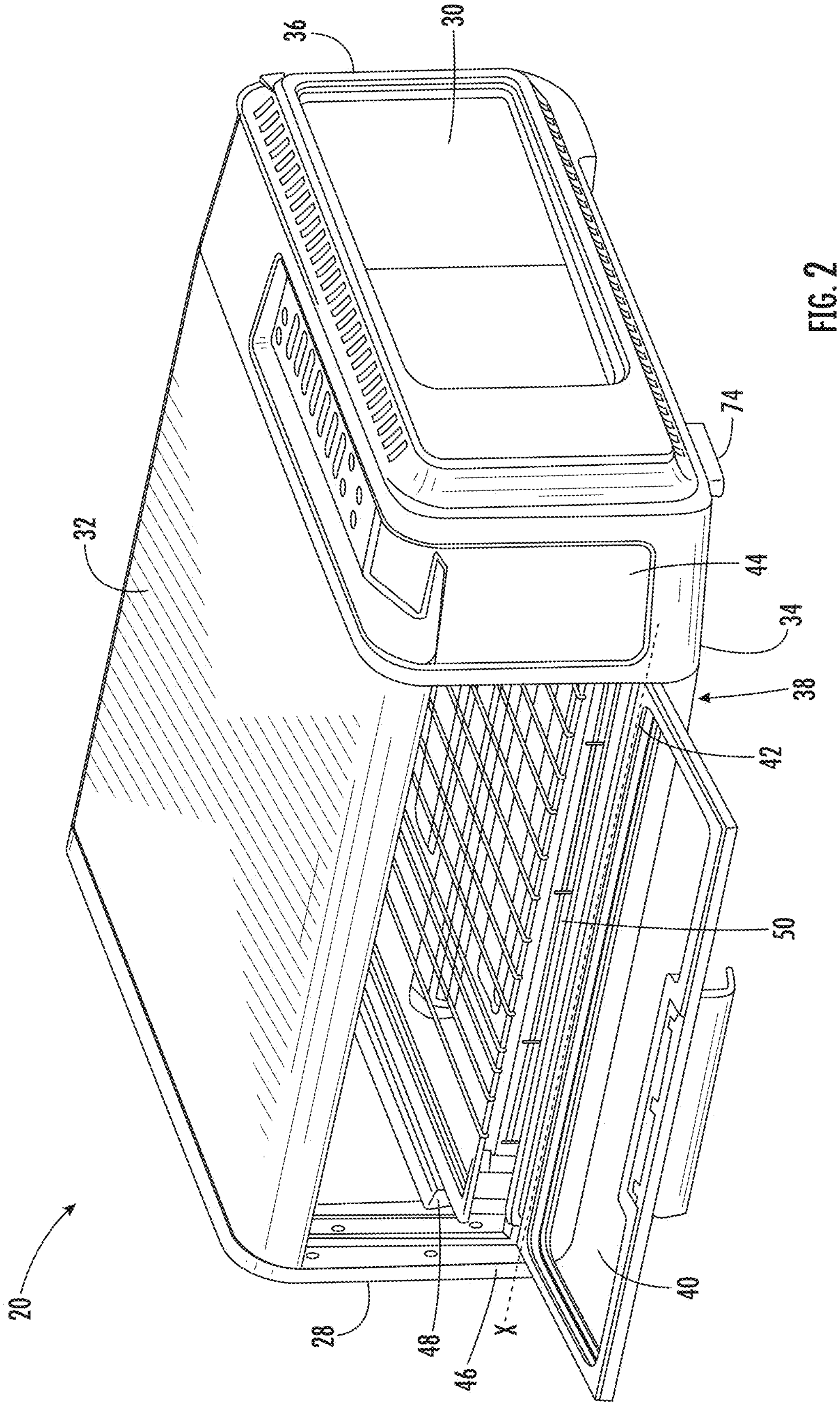
FIG. 2 is a front perspective view of a cooking system with a door in an open position according to an embodiment.

The front wall 38 of the housing 24 may include a door 40 that is movable relative to the remainder of the housing 24 to selectively provide access to the internal heating compartment 26. As shown in the illustrated, non-limiting embodiment, the door 40 includes a transparent panel and is hinged along an edge thereof for rotation about a hinge axis X between an open position (FIG. 2) and a closed position (FIG. 1). Although the hinge axis X is illustrated as being located at a bottom edge 42 of the door 40, embodiments where the hinge axis X is defined at an upper edge or a side edge of the door 40 are also within the scope of the disclosure. Further, although the door 40 is described as being pivotable about a hinge axis X, it should be understood that embodiments where the door 40 is configured to translate relative to the housing 24, or where the door 40 is removably coupled to the housing 24 are also contemplated herein.

In some embodiments, the door 40 may define the entire front wall 38 of the housing 24. However, in other embodiments, the door 40 may define only a portion of the front wall 38, and the front wall 38 may further include a panel 44 located adjacent to one or more sides of the door 40. As shown, the panel 44 may extend between the left and right sidewalls 28, 30, respectively, and between the top and bottom 32, 34, respectively of the housing 24. In such embodiments, an opening 46 (best shown in FIG. 2) for providing access to the internal heating compartment 26 of the housing 24 is formed in the panel 44 and the door 40 is mounted in overlapping arrangement with the opening 46. It should be understood that embodiments where the front wall 38 of the housing 24 includes only a panel 44 and no door 40 are also within the scope of the disclosure.

Figure 3:
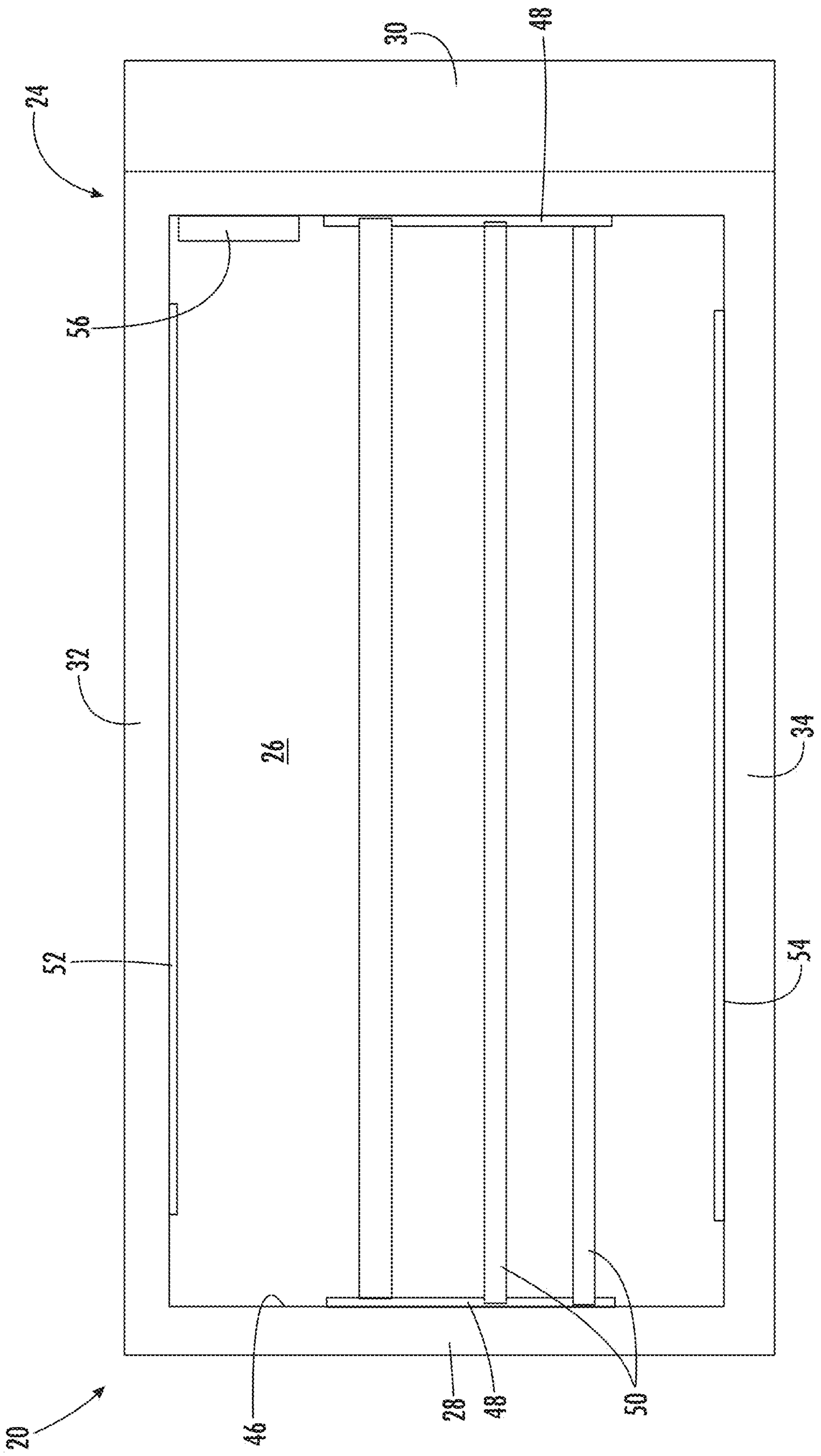
FIG. 3 is a schematic diagram of a cooking system according to an embodiment.

With reference now to FIG. 3, mounted within the internal heating compartment 26 of the housing 24 is at least one fixture 48. In the illustrated, non-limiting embodiment, a pair of opposing fixtures 48 are mounted to an interior surface of the left sidewall 28 and the right sidewall 30, respectively. The one or more fixtures 48 are positioned to support one or more cooking accessories 50, such as a removable cooking rack, basket, spit, or drip tray for example, at a desired position within the internal heating compartment 26.

The internal heating compartment 26 of the housing 24 is heated by at least one heating element. In an embodiment, the cooking system 20 includes one or more first heating elements 52 positioned within the internal heating compartment 26, for example adjacent the top 32 of the housing 24. In the illustrated, non-limiting embodiment, the cooking system 20 includes a plurality of first heating elements 52, such as three first heating elements for example, oriented generally parallel to the hinge axis and spaced across a depth of the top 32 of the housing 24. It should be understood that any number of first heating elements 52 and any configuration of the first heating elements 52 are contemplated herein. Alternatively, or in addition, at least one second heating element 54 may be positioned within the internal heating compartment 26, for example adjacent the bottom 34 of the housing 24. In the illustrated, non-limiting embodiment of FIG. 10-11, the cooking system 20 includes a plurality of second heating elements 54, such as three second heating elements for example, oriented generally parallel to the hinge axis and spaced across a depth of the bottom 34 of the housing. The first heating elements 52 and the second heating elements 54 may be generally aligned, or may be staggered relative to one another.

It should be understood that although the heating elements 52, 54 of the cooking system 20 are illustrated and described as being positioned generally adjacent the top 32 and bottom 34 of the housing 24, embodiments where the cooking system 20 alternatively or additionally includes one or more heating elements (not shown) located adjacent a side of the internal heating compartment 26, or within a center of the internal heating compartment 26 are also contemplated herein.

The one or more heating elements 52, 54 of the cooking system 20 may be selected to perform any suitable type of heating, including but not limited to, conduction, convection, radiation, and induction. Accordingly, the at least one heating element 52, 54 may be any type of heating element, such as a tubular, quartz, tungsten, and halogen heating element. It should be understood that in embodiments of the cooking system 20 having a plurality of heating elements 52, 54 arranged at multiple locations within the internal heating compartment 26, the plurality of heating elements 52, 54 may be substantially identical, or alternatively, may be different, and further may be operable to perform similar or distinct types of heating. In an embodiment, both the first and second heating elements are radiant heating elements. However, heating elements operable to perform other combinations of heating are contemplated herein. Further, in some embodiments, the cooking system 20 may additionally include a fan 56 operable in conjunction with or independently of the heating elements 52, 54 to circulate air or another fluid through the internal heating compartment 26.

With reference to FIGS. 12-16, the configuration of the internal heating cavity 26 of the cooking system 20 may be selected to optimize the heat distribution therein via one or more structures positioned and included therein. This optimization may be implemented in various ways. In an embodiment, the cooking system 20 includes a reflector 110 located within the internal heating cavity 26 and configured to redirect a portion of the heat emitted from a plurality of heating elements, such as the first heating elements 52 for example, to achieve an even heat distribution throughout the internal heating cavity 26. In an embodiment, the reflector 110 has a width and depth generally equal to the internal heating cavity 26. However, embodiments, where the reflector 110 is smaller than the internal heating cavity are also contemplated herein.

The reflector 110 may be made from any suitable material and has surface properties such that at least a portion, if not all, of the heat or light that contacts the surface of the reflector 110 bounces of the surface and is redirected within the internal heating compartment 26. In the illustrated, non-limiting embodiment of FIGS. 12 and 13, the reflector 110 has a corrugated configuration, including a plurality of top flanges 112 and a plurality of bottom flanges 114 coupled by angled surfaces 116. The angles surfaces 116 extending between adjacent upper and lower surfaces 112, 114 may be similar, or alternatively, may be different. The plurality of upper surfaces 112 may be arranged within a first plane U and the plurality of bottom flanges 114 may be arranged within a second plane B, as shown. The first plane U and the second plane B may, but need not be parallel to one another. In an embodiment, the first plane and the second plane are offset by a distance generally equal to a height of the first heating element 52. The plurality of first heating elements 52 are generally arranged within an opening 118 defined between the plane U of the upper surfaces 112 and the plane B of the lower surfaces 114, adjacent an upper flange 114.

Figure 11:
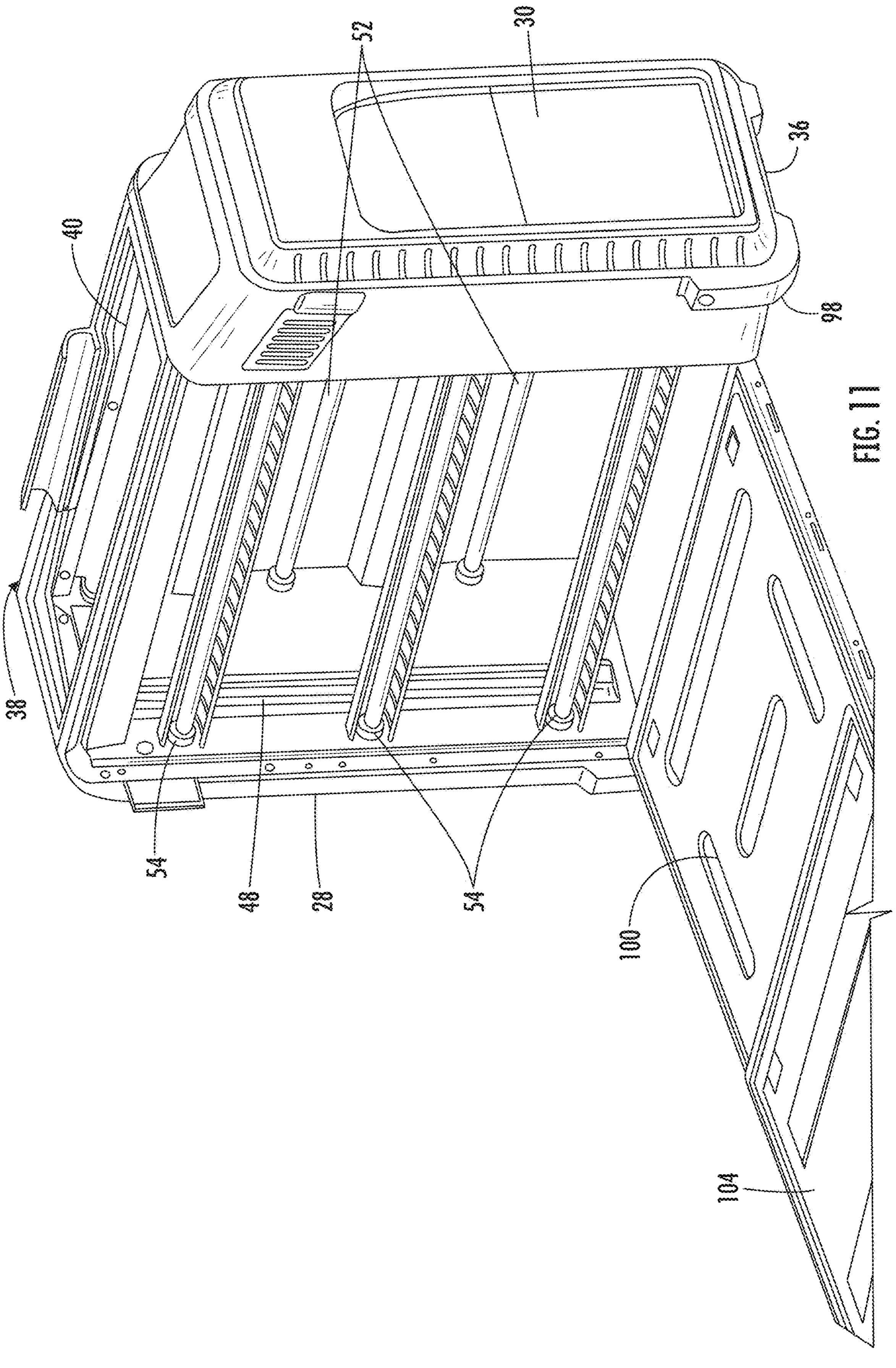
FIG. 11 is a perspective view of a cooking system in a second stowed configuration with a cleaning door in an open configuration and an interior liner of the internal heating compartment partially removed according to an embodiment.
Figure 12:
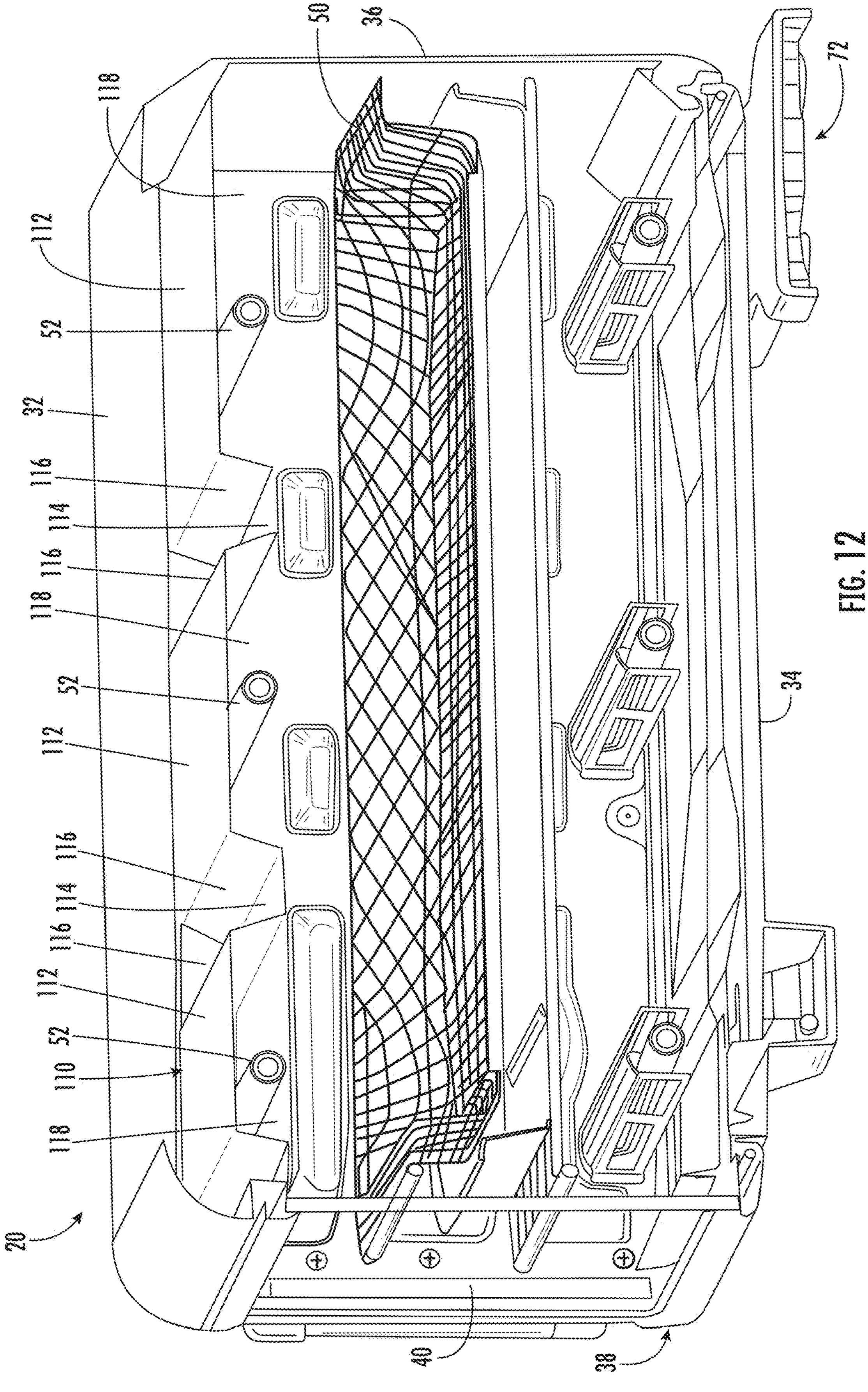
FIG. 12 is a perspective cross-sectional view of a cooking system according to an embodiment.
Figure 13:
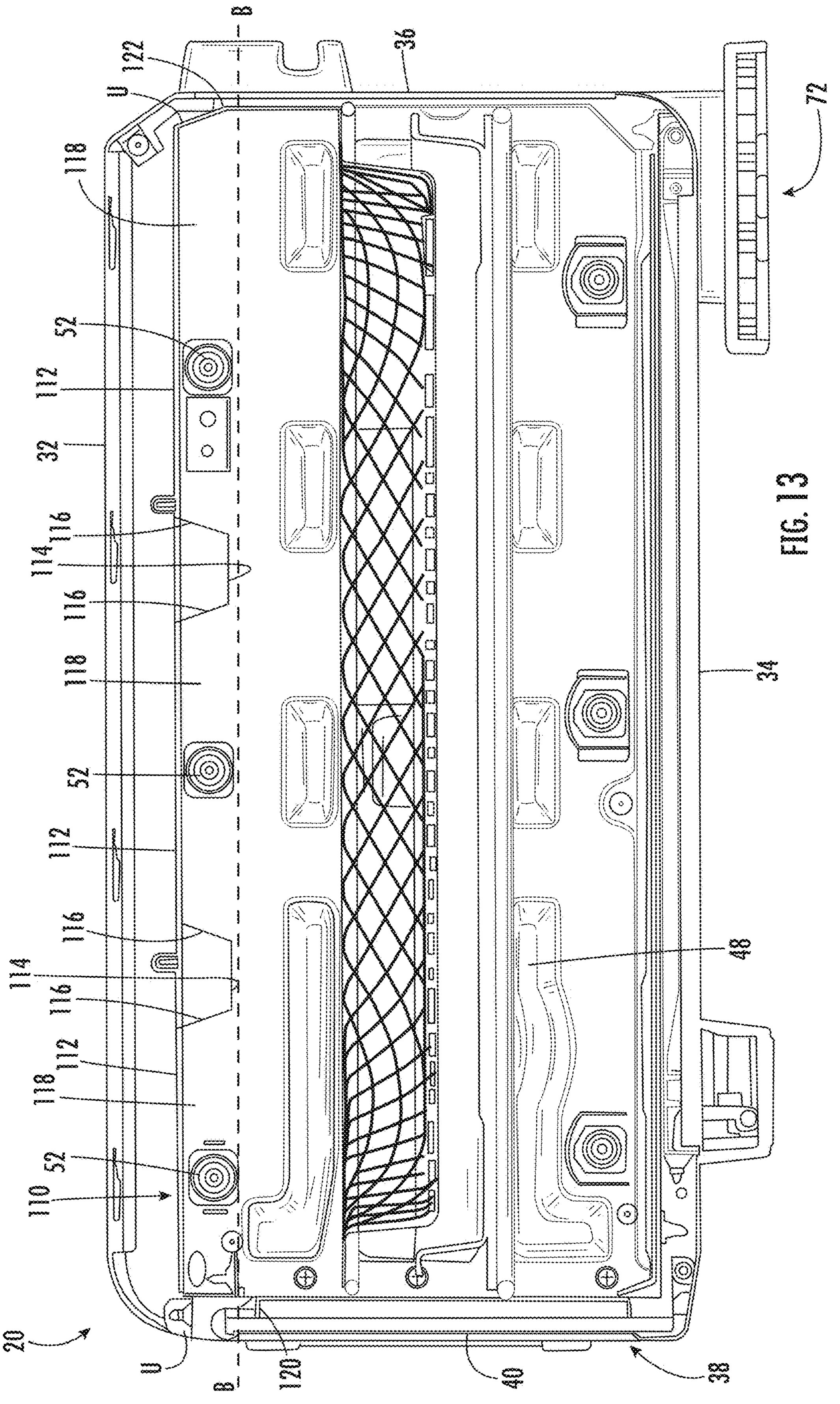
FIG. 13 is a perspective cross-sectional view of a cooking system according to an embodiment.

Depending on the position of the heating element 52 within the internal heating compartment 26, the depth of the upper flange 112 associated with each heating element 52 and the location of the heating element 52 relative to the upper flange 114 may vary. As shown, the depth of the upper flange 114 adjacent the rear wall 36 is greater than the depth of the upper flange 114 at a center of the internal heating compartment 26, which is greater than the depth of the upper flange 114 adjacent the front wall. Similarly, the heating element 52 located adjacent the front wall 38 is offset from a center of the corresponding upper flange 114, in a direction toward the front wall 38. The central heating element 52 is generally centered relative to the corresponding upper flange 114, and the heating element 52 adjacent the rear wall 36 is similarly offset from a center of the corresponding upper flange 114, for example in a direction toward the front wall 38. In an embodiment, a first end of the reflector 120 extending to the front wall 38 includes a partial bottom flange 114, and the second, opposite end 122 of the reflector 110 abuts the rear wall 36 via a downwardly angled surface extending from an upper flange 112. An example of a model of the heat distribution achieved using a contoured reflector as shown in FIGS. 11 and 12, is illustrated in FIGS. 17 and 18.

Figure 14A:
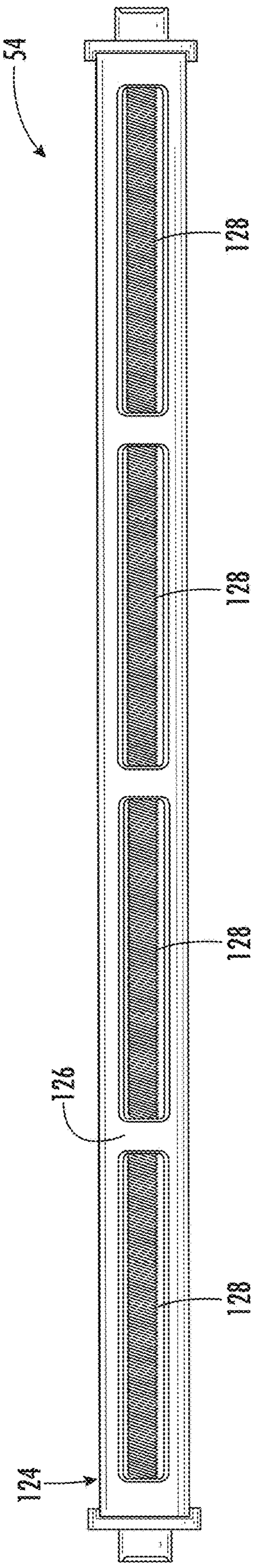
FIG. 14A is a perspective view of a heating element guard according to an embodiment.
Figure 14B:
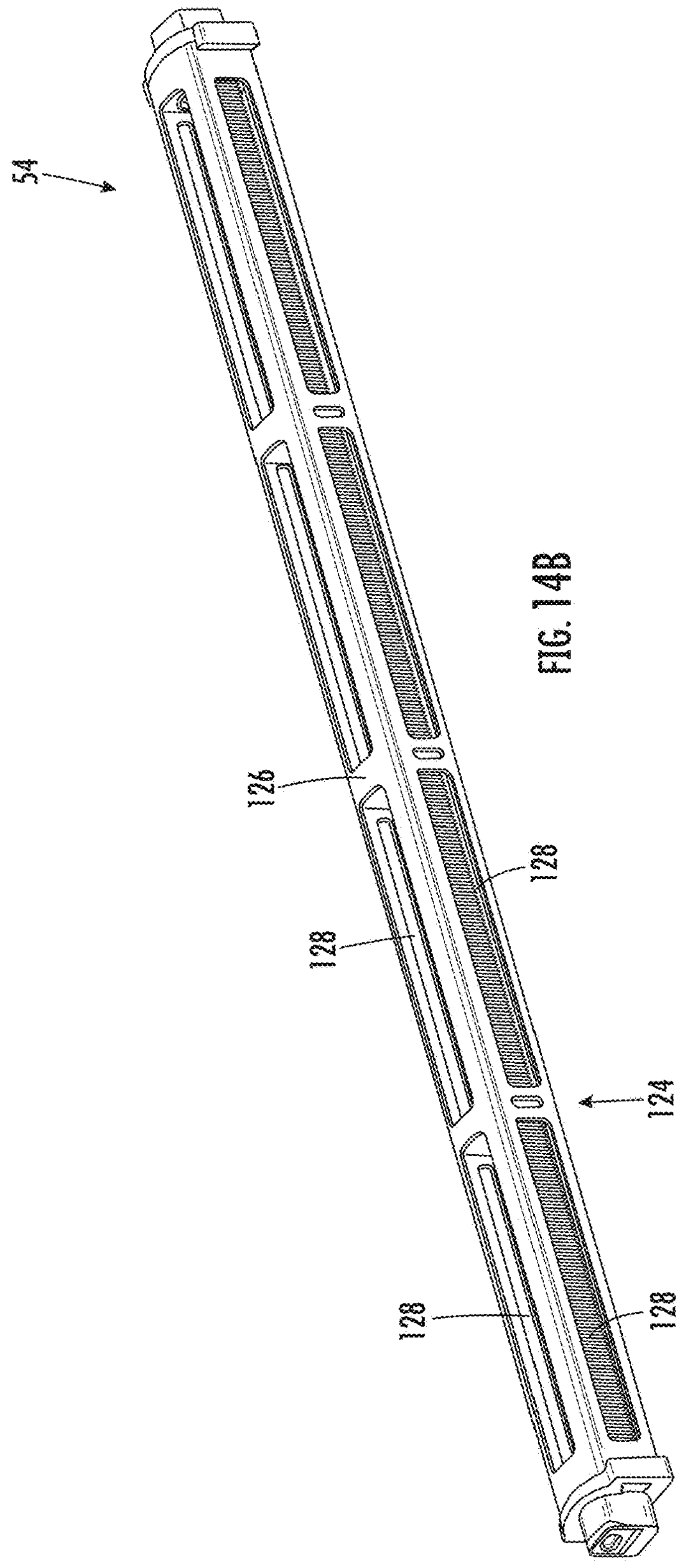
FIG. 14B is a plan view of the heating element guard of FIG. 14A according to an embodiment.

Alternatively, or in addition, the heat distribution within the internal heating compartment 26 may be controlled by including one or more guard elements 124 in overlapping arrangement with the heating elements, such as the second heating elements 54 for example. As shown, each guard 124 includes a body 126 extending around at least three sides of a heating element 54. One or more openings 128 are formed in the body 126 to allow heat emitted by the heating element 54 to transmit into the internal heating compartment 26. In an embodiment, the configuration of the openings 128 formed in each of the guard bodies 126 varies based on the position of a corresponding heating element 54 within the internal heating compartment 26. The configuration of the openings 128 may similarly vary over the length of each heating element 54. An example of a guard 124 for use with a heating element 54 positioned adjacent the front wall 38 is illustrated in FIGS. 14A-14B. As shown, a plurality of large openings 128 extend generally uniformly over multiple sides of the body 126. Because heat within the internal heating compartment 26 is lost through opening formed in the front wall 38, the guard 124 for the heating element 54 arranged adjacent the front wall 38 allows more heat to pass there through than the guards 124 coupled to the heating elements 54 arranged at the center of the internal heating compartment 26 and adjacent the rear wall 36.

Figure 15A:
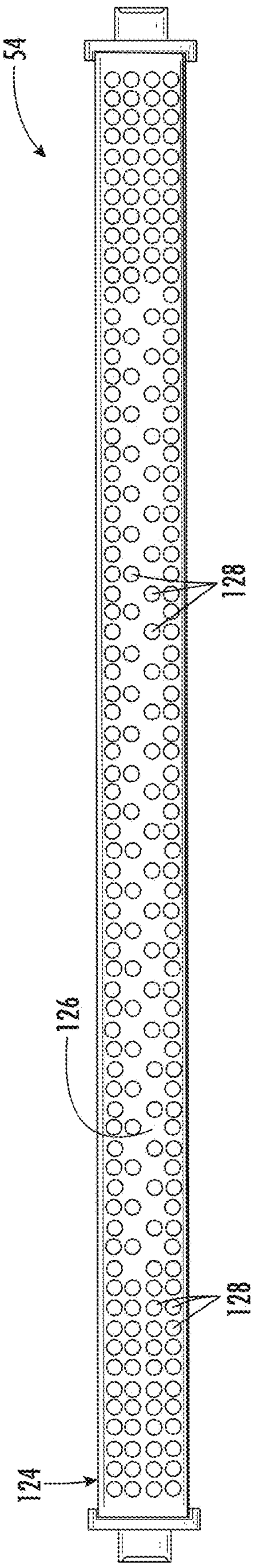
FIG. 15A is a perspective view of a heating element guard according to an embodiment.
Figure 15B:
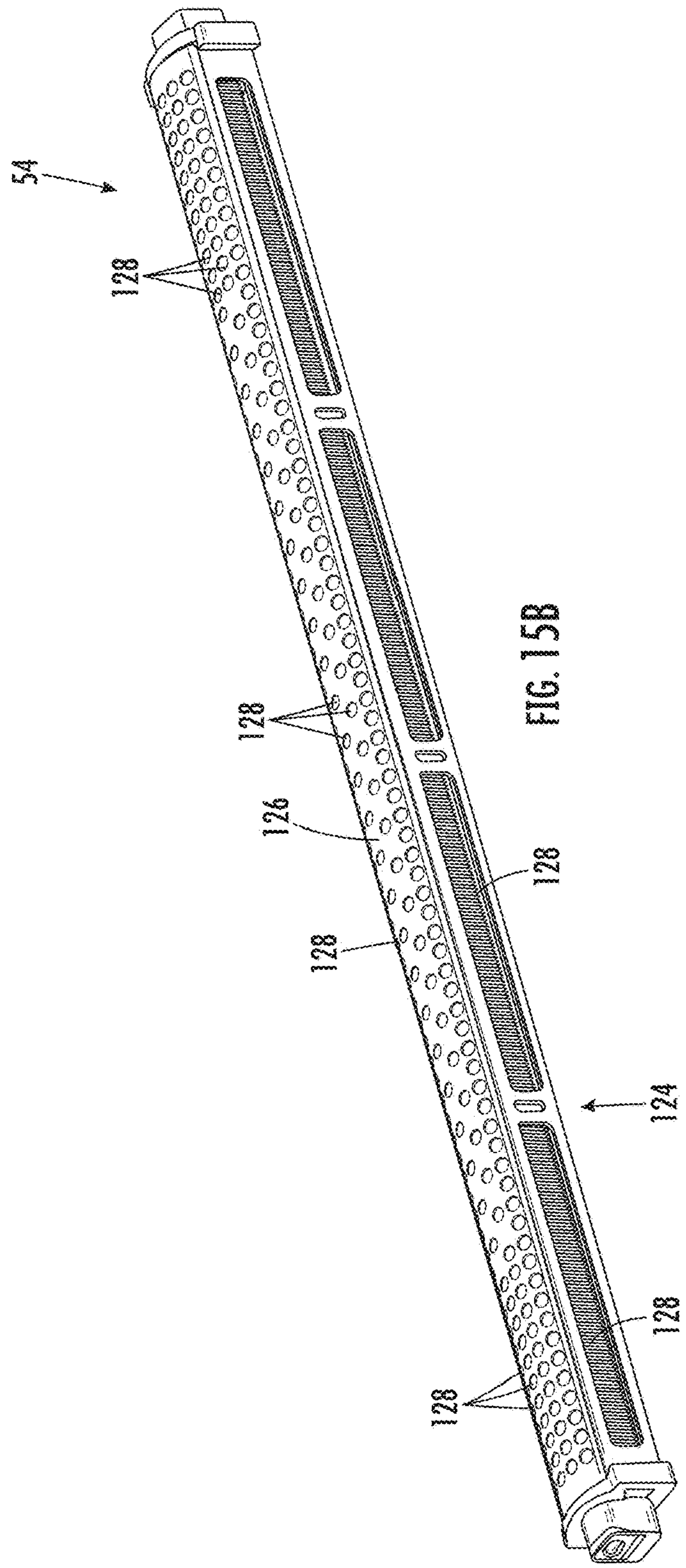
FIG. 15B is a plan view of the heating element guard of FIG. 14A according to an embodiment.
Figure 16:
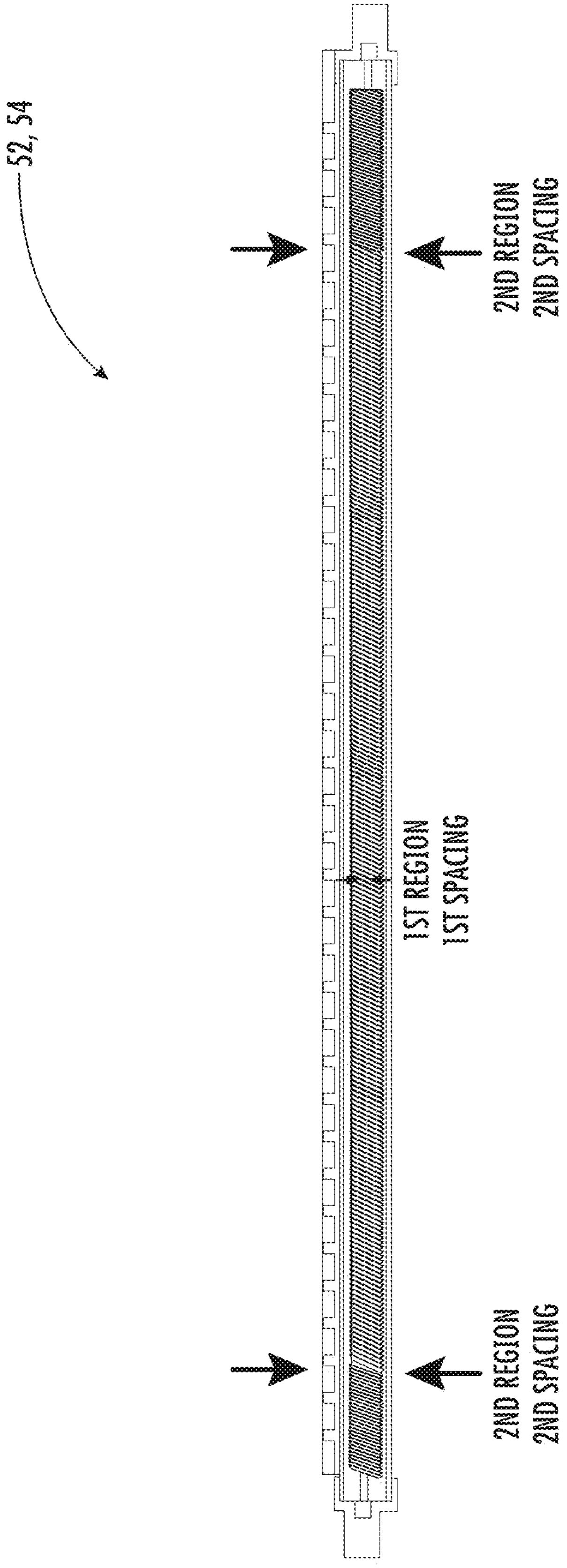
FIG. 16 is a schematic diagram of a heating element according to an embodiment.

An example of a guard 124 for use with a heating element 54 arranged at a center of the internal heating compartment 26, or alternatively, adjacent the rear wall 36, is illustrated in FIGS. 15A-15B. As shown, the body 124 includes a plurality of smaller openings 128 formed over an upper surface of the body 124. Further, the density of the openings 128 varies over the length of the body 124. In the illustrated, non-limiting embodiment, a greater number of openings 128 are formed adjacent the ends 130, 132 of the body 124 and therefore the ends of the heating elements 54, than at the center of the heating element 54. This reduced number of openings 128 adjacent the center of the guard 124 is intended to reduce the heat emitted from a center of the central and rear heating elements 54. Accordingly, the openings 128 formed in the guards 124 are intended to control the distribution of the heat emitted by the heating elements 54 between the front and real walls 38, 36, and between the left and right sidewalls 28, 30 that define the internal heating compartment 26.

Figure 17:
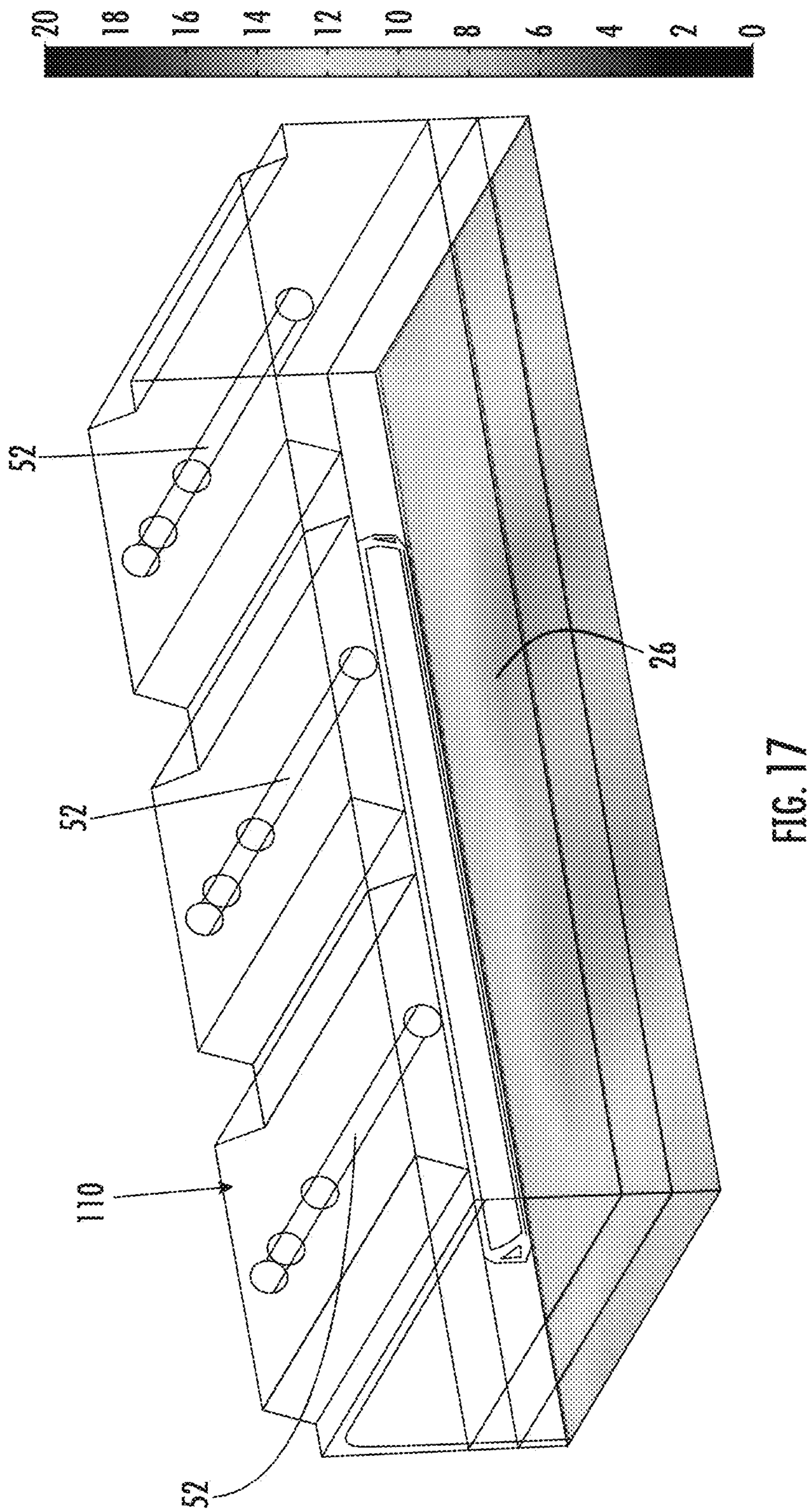
FIG. 17 is a perspective model of the heat distribution within the internal heating compartment of the cooking system according to an embodiment.
Figure 18:
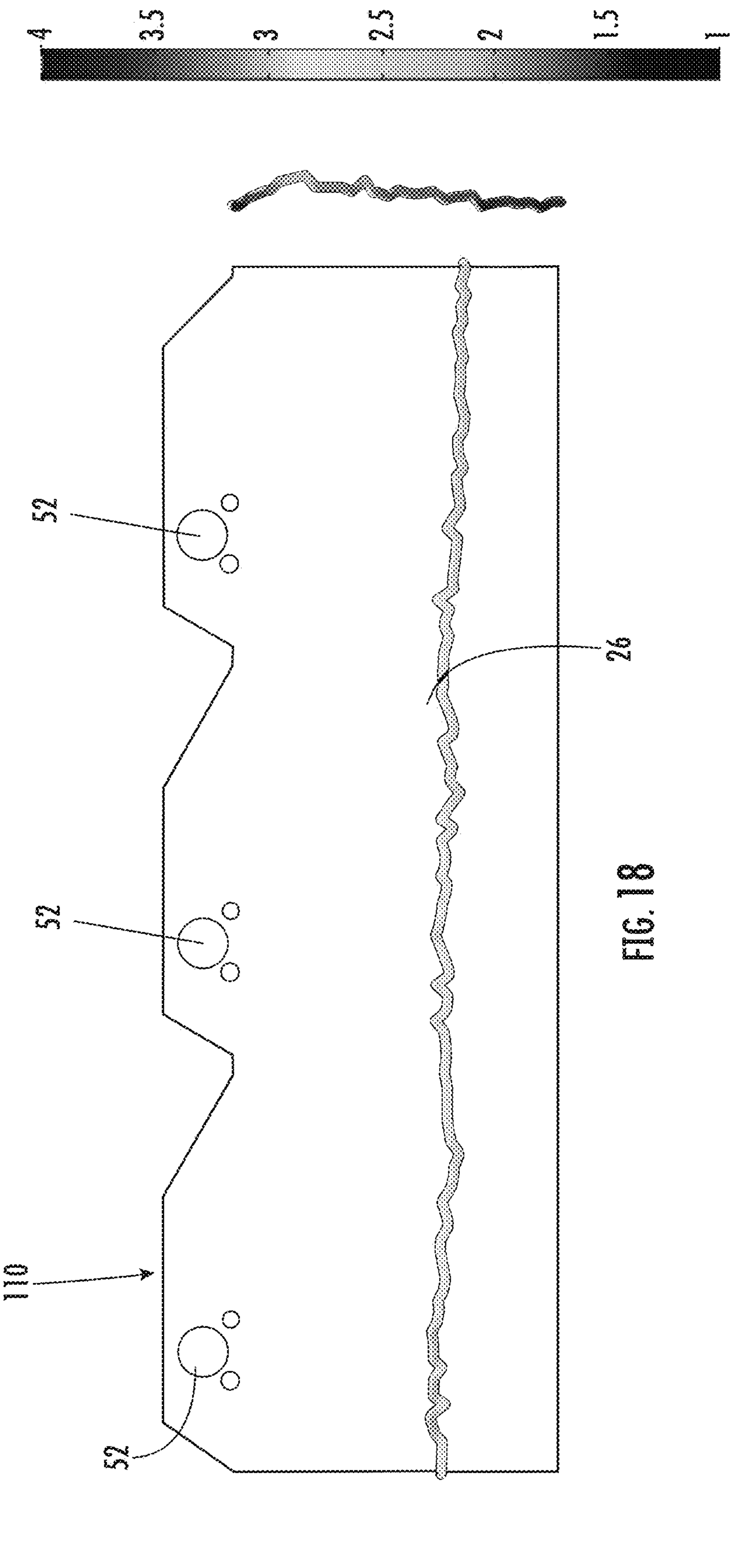
FIG. 18 is a model of a cross-section of the heat distribution within the internal heating compartment of the cooking system according to an embodiment.

Further, with reference to FIG. 17, in an embodiment, the heat output across one or more of the heating elements 52, 54 may vary. In an embodiment, one or more of the heating elements 52, 54 is constructed using coiled wire arranged within a tube which heats and emits radiation when power is supplied thereto. By varying the spacing between adjacent coils over the length of the heating element 52, 54, the amount of heat emitted at various portions of the heating element 52, 54 may be greater than others. In the illustrated, non-limiting embodiment, the heating elements 52, 54 are configured such that the spacing of the wire coils within a first region of the heating element 52, 54, such as the center of the heating element 52, 54 for example, is wider than the coil spacing within a second region of the heating element 52, 53, such as adjacent the ends of the heating element 54. For example, the coil within the first 12.5% of the length of the heating element 52, 54 may have a first coil spacing, the next 75% of the heating element 52, 54 may have a second coil spacing, and the final 12.5% of the heating element 52, 54 may also be constructed with the first coil spacing. Further, the construction of the first and second heating elements 52, 54 may be distinct. In an embodiment, one or more of the plurality of first heating elements 52 has a first coil spacing equal to 1.25 times the second coil spacing and one or more of the plurality of second heating elements 54 has a first coil spacing equal to 1.5 times the second coil spacing. It should be understood that a heating element 52, 54 having more than two areas of distinct coil spacings, and different ratios of the coil spacings are also contemplated herein.

Figure 4:
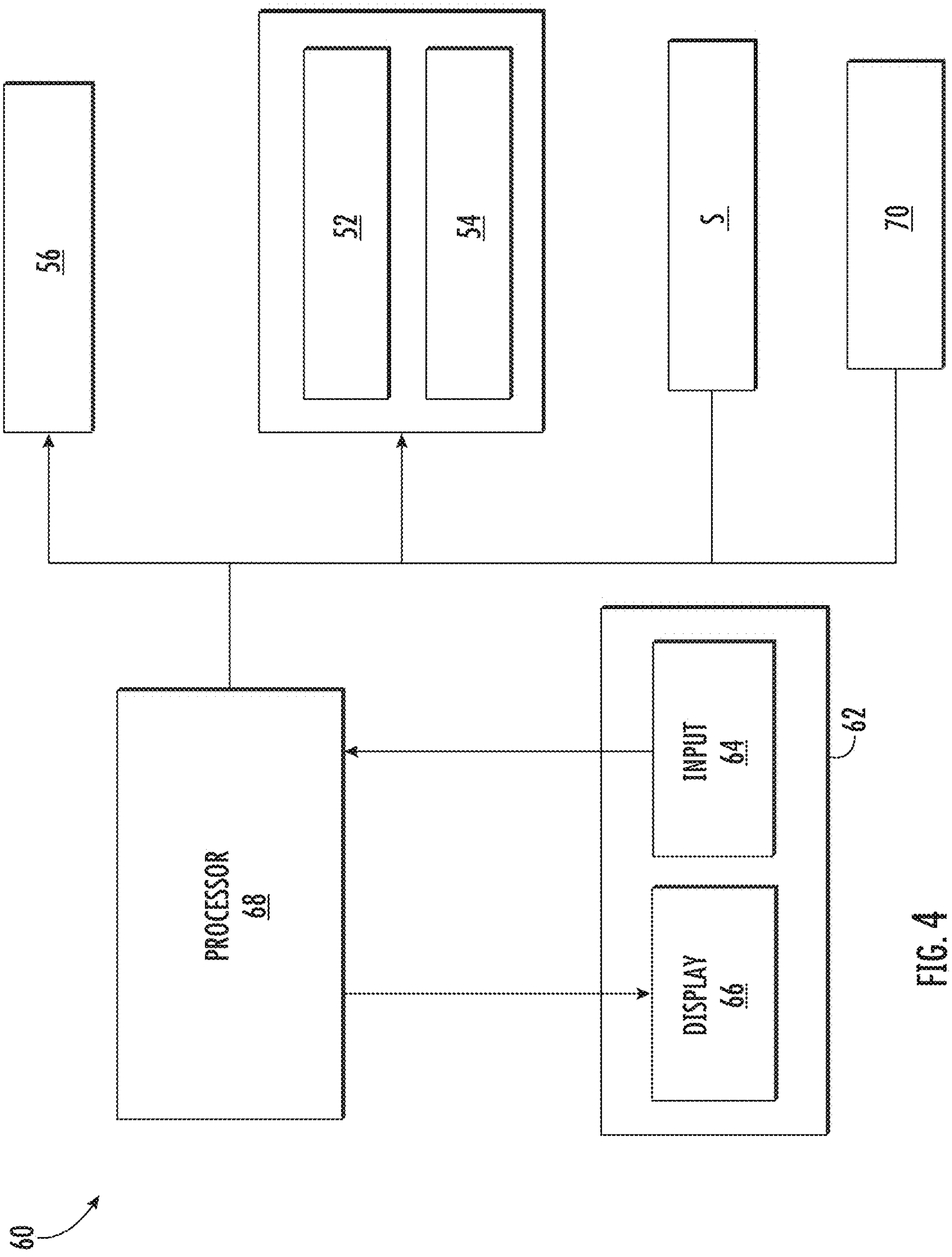
FIG. 4 is a schematic diagram of a control system of a cooking system according to an embodiment.
Figure 5:
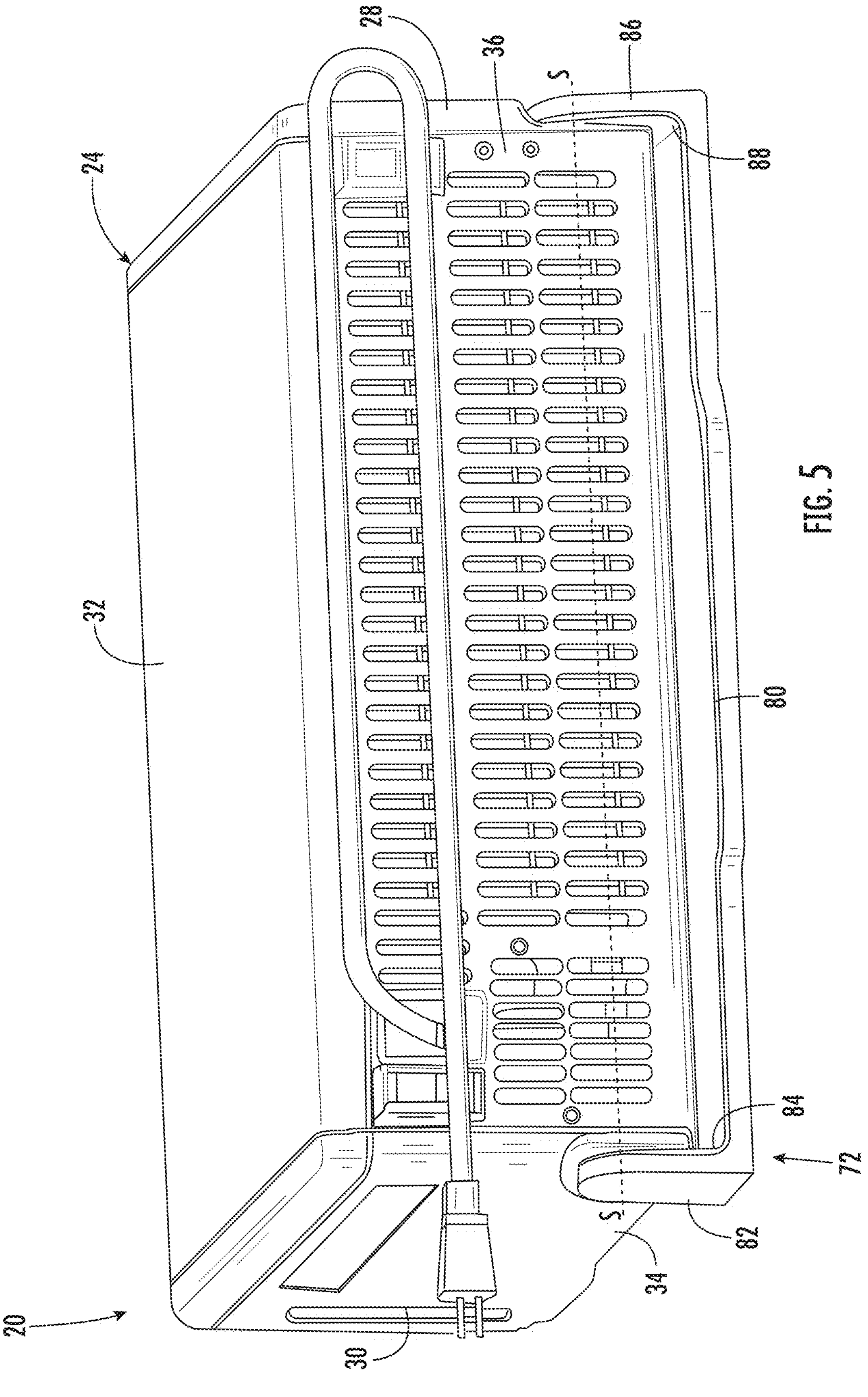
FIG. 5 is a rear perspective view of a cooking system according to an embodiment.

With reference now to FIG. 4, a control panel or user interface 62 for operating the cooking system 20 is mounted to an exterior portion of the housing 24, for example the panel 44 or the top. The control panel 62 is part of a control system 60 that is electrically connected to the one or more heating elements 52, 54. The control panel 62 includes one or more inputs 64 associated with energizing the one or more heating elements 52, 54 of the cooking system 20 and for selecting various modes of operation of the cooking system 20. One or more of the inputs 64 may include a light or other indicator to show that the respective input 64 has been selected. The control panel 62 may additionally include a display 66 separate from and associated with the at least one input 64. However, embodiments where the display 66 is integrated into the at least one input 64 are also contemplated herein.

Operation of the one or more inputs 64 will be described in more detail below. As shown in FIG. 4, the control system 60 includes a controller or processor 68 for controlling operation of the heating elements 52, 54 in response to a user input provided via the one or more inputs 64 and for using algorithms to execute stored sequences of heating operation. In embodiments where the cooking system 20 includes a plurality of heating elements 52, the heating elements 52, 54 may be independently operable. Further, the heating output of one or more of the heating elements 52, 54 may be variable in response to the power supplied to the heating elements 52, 54. The control system 60 may include one or more sensors S arranged in communication with the processor 68 and operable to monitor one or more parameters, for example temperature within the internal heating compartment 26.

In an embodiment, at least one input 64 on the control panel 62 is an on/off button which allows the user to activate or deactivate the control panel 62. When the control panel 62 is deactivated, none of the heating elements 52, 54 are energized. In an exemplary embodiment, the at least one input 64 is operable to select one or more manual modes of operation of at least one of the heating elements 52, 54. Alternatively, or in addition, at least one input 64 is operable to select a stored sequence of operation of at least one heating element 52, 54. In some cases, the stored sequences may be particularly well suited for a given method of food preparation and/or for particular ingredients or types of ingredients. The plurality of stored sequences associated with the at least one input 64 may be stored within a memory accessible by the processor 68. Alternatively, the plurality of stored sequences may be stored remotely from the cooking system 20, and may be accessed by the processor 68, such as via wireless communication for example.

In addition, a user may be able to enter or select a time associated with operation of the cooking system 20 in a desired manual mode. The time may be entered via the same input 64, or a separate input 64 as used to select a mode of operation. Further in embodiments where the cooking system 20 is in a mode configured to perform a stored sequence in response to selection of one of the inputs, the display 66 may indicate a time remaining on the display 66. Temperature or other parameters, such as toasting color for example, may also be entered via inputs 64.

The at least one input 64 may include a distinct start button intended to initiate operation in a desired mode, a distinct stop button to cease all operation, or a stop/start button intended to initiate and cease functions. Alternatively, the cooking system 20 may be operable to automatically start operation after a predetermined time has elapsed once an input has been selected and any necessary information has been provided to the control panel 62. One or more of the other inputs 64, such as a knob for example, may be operable, such as by pushing the knob towards the control panel 62, to start and stop operation of the cooking system 20, regardless of whether the cooking system 20 is following a stored sequence or is in a manual mode.

The one or more inputs 64 are operable to initiate operation of the cooking system 20 in a plurality of cooking modes. Examples of modes of operation of the cooking system 20 include, but are not limited to, toast, bake, broil, grill, warm, reheat, and steam cook. Independent control of the heating elements 52, 54 allows a user to configure a cooking/heating cycle based on the type of food item positioned within the internal heating compartment 26.

Figure 7B:
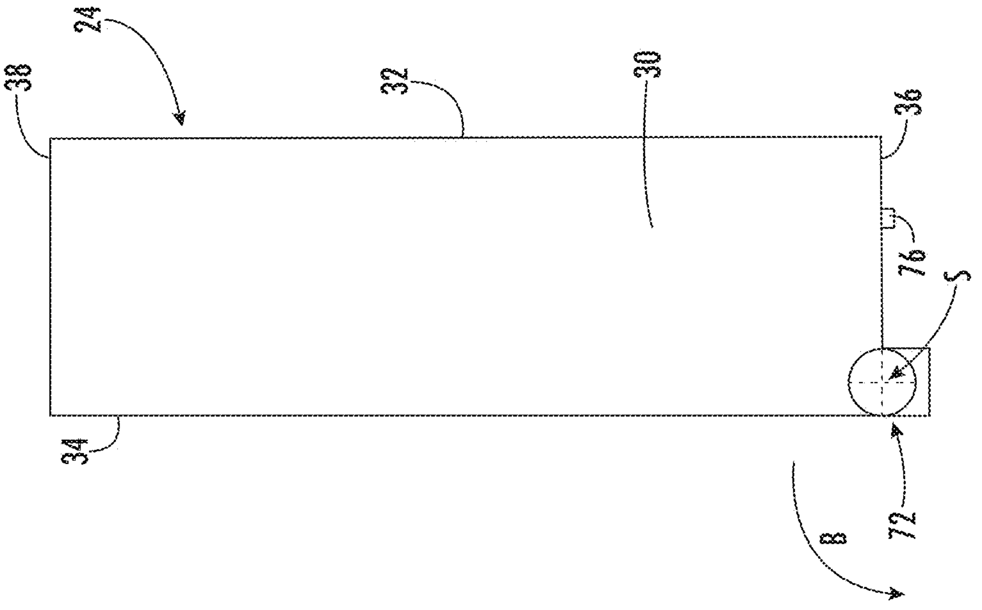
FIG. 7B is a schematic diagram of the cooking system of FIG. 7A in a second, stowed configuration according to an embodiment.
Figure 7A:
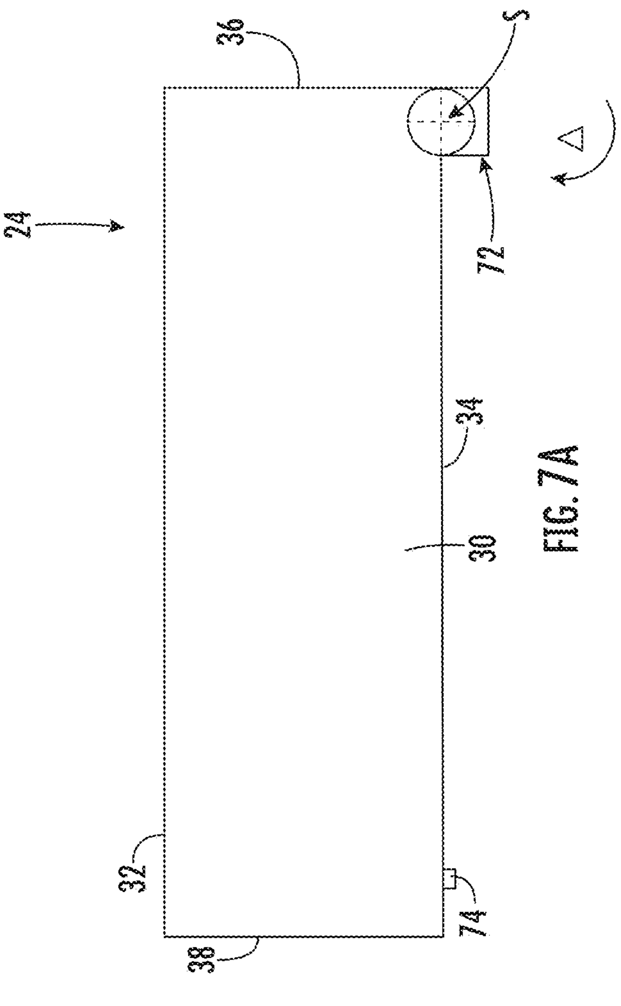
FIG. 7A is a schematic diagram of a cooking system in a first, active configuration according to an embodiment.

In an embodiment, the housing 24 of the cooking system 20 is movable between a first operational or "active" position (see FIG. 7A) and a second non-operational or "stowed" position (see FIG. 7B). In the first active position, the control system 60 is operable to energize the one or more heating elements 52, 54 and fan 56 of the cooking system 20. When the cooking system 20 in the second stowed position, the one or more heating elements 52, 54 and fan 56 may be prevented from being energized. For example, the cooking system 20 may include a switch, illustrated schematically at 70 in FIG. 4, such that when the cooking system 20 is in the second stowed position, the switch 70 is open, thereby blocking power from being supplied to any of the heating elements 52, 54 and fan 56. However, it should be understood that embodiments where the heating elements 52, 54 and/or fan 56 may be energized when the housing is in the stowed configuration are also contemplated herein.

In the illustrated, non-limiting embodiment, the housing 24 of the cooking system 20 is rotatable about a swivel axis S between the first position and the second position. The swivel axis S is defined by a swivel support 72 coupled to or integrally formed with the housing 24. Accordingly, the swivel support 72 locates at least a portion of the housing 24 relative to the support surface 22. In the first active position, the housing 24 and the internal heating compartment 26 defined therein have a generally horizontally orientation. As shown, in the first active position, at least one of the top 32 and bottom 34 of the housing 24 is arranged generally parallel to support surface 22 on which the cooking system 20 is located, and the front wall 38, including the opening 46 formed therein, is oriented generally perpendicular to the support surface 22. In an embodiment, the cooking system 20 includes one or more first feet 74 extending from the housing 24, such as from the bottom 34 thereof. In such embodiments, the first feet 74 cooperate with the swivel support 72 to position the cooking system 20 on the support surface 22. However, in other embodiments, the housing 24 of the cooking system 20 may be support entirely by the swivel support 72, for example in a cantilevered configuration, when in the first active position.

The cooking system 20 is rotatable about the swivel axis S in a first direction, indicated by arrow A, toward the second stowed position. In an embodiment, the cooking system 20 is rotatable approximately ninety degrees between the first position and the second position. In the second stowed position, shown in FIG. 7B, the housing 24 and the internal heating compartment 26 are oriented generally vertically. In the second stowed position, at least one of the rear wall 36 and the front wall 38 is oriented generally parallel to the support surface 22 and the bottom 34 is oriented perpendicular to the support surface 22. In an embodiment, the cooking system 20 includes one or more second feet 76 extending from the housing 24, such as from the rear wall 36 thereof. In such embodiments, the second feet 76 cooperate with the swivel support 72 to position the cooking system 20 on the support surface 22 in the second stowed position. However, in other embodiments, the housing 24 of the cooking system 20 may be support entirely by the swivel support 72, for example in a cantilevered configuration, when in the second stowed position.

From the stowed position, the housing 24 of the cooking system 20 is rotatable about the swivel axis S in a second direction, indicated by arrow B, toward the first active position. As the housing 24 of the cooking system 20 transforms between the first position and the second position, the front wall 38 and/or the opening 46 or door 40 associated therewith rotates out of plane i.e. from a first plane to a second plane distinct from the first plane. Because the projected surface area of the housing 24 in the second position is substantially smaller than the projected surface area of the housing 24 in the first position, the surface area of the support surface 22 occupied by the cooking system 20 when the cooking system 20 is not in use is minimized.

In an embodiment, the swivel axis S is positioned near an edge of the housing 24. For example, the swivel axis S is shown being located adjacent the back rear corner of the housing 24, near the interface between the bottom 34 and the rear wall 36 of the housing 24. However, it should be understood that embodiments where the swivel axis S is arranged along another edge of the housing 24, such as adjacent the interface between the bottom and a sidewall 28, 30 for example, are also contemplated herein.

Figure 6:
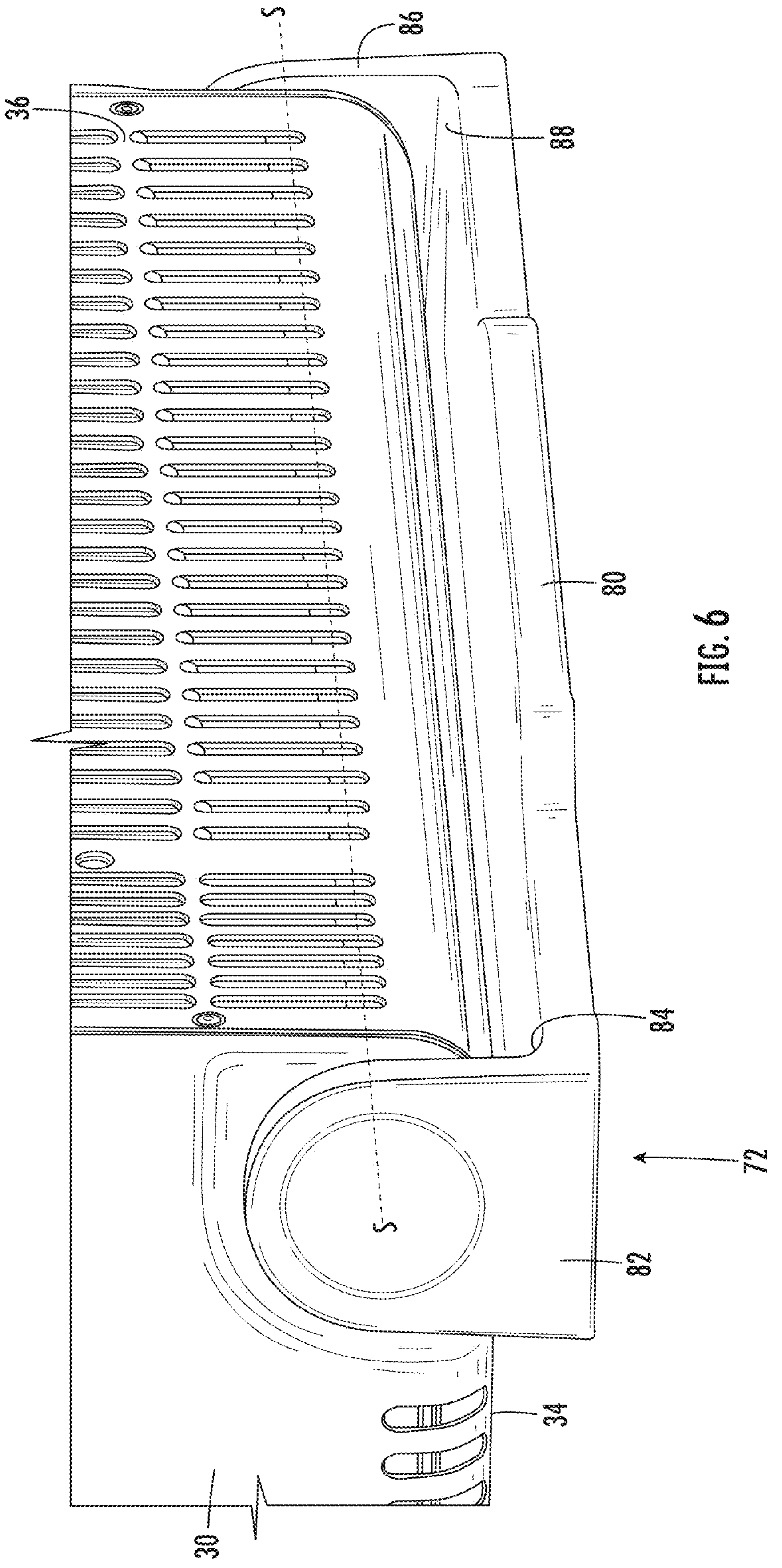
FIG. 6 is a detailed perspective view of a swivel support of a cooking system according to an embodiment.
Figure 8:
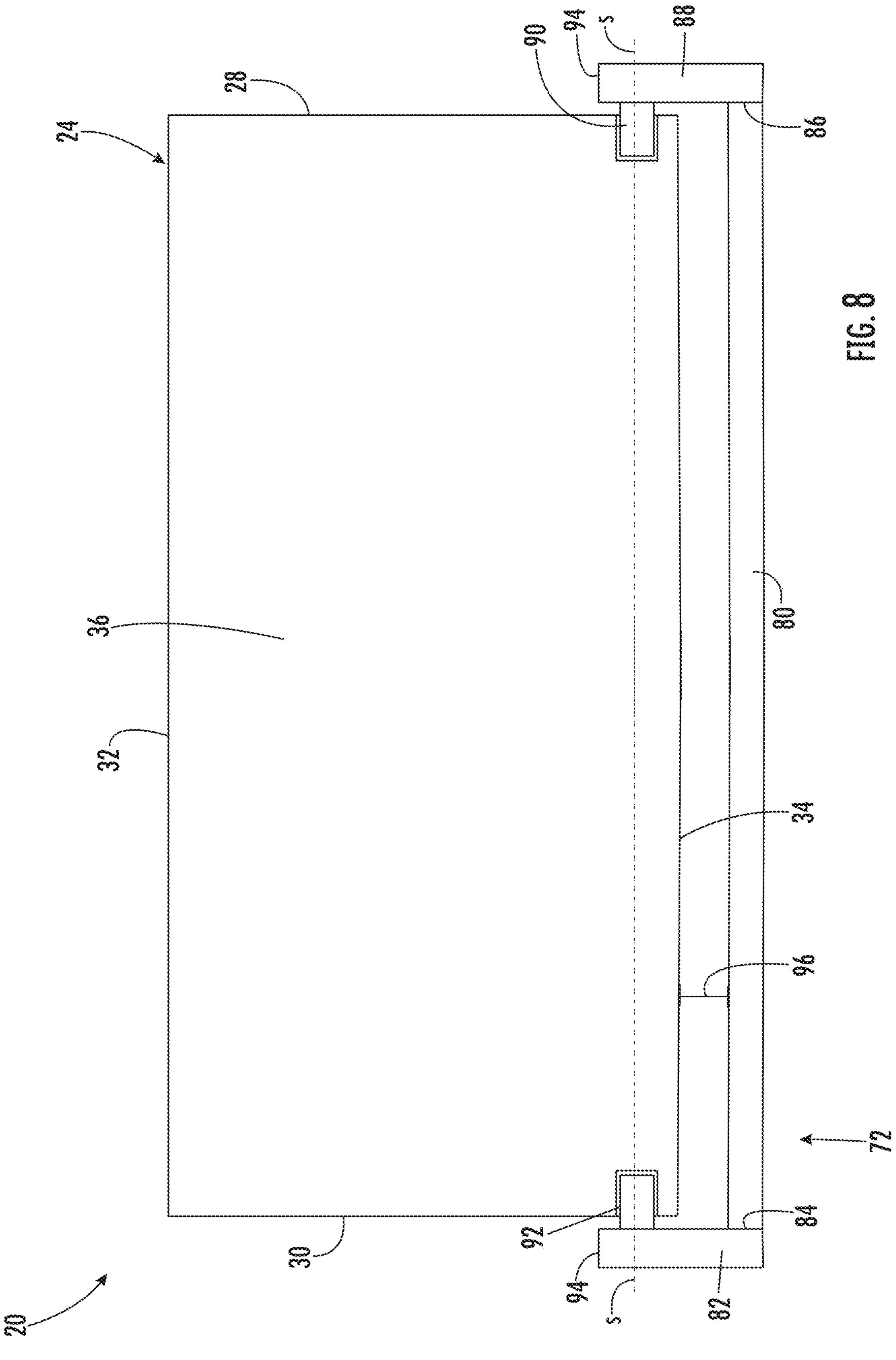
FIG. 8 is a schematic diagram of an interface between the swivel support and the housing of the cooking system according to an embodiment.

With reference now to FIGS. 6-8, in the illustrated, non-limiting embodiment, the swivel support 70 includes a base 80 having a first support arm 82 extending from a first end 84 of the base 80 and a second support arm 86 extending from a second end 88 of the base 80. However it should be understood that a swivel support 70 including only a single support arm, or more than two support arms are also within the scope of the disclosure. The first support arm 82 and the second support arm 86 may be integrally formed with the base 80, or alternatively, may be separate components affixed thereto. In the illustrated embodiment, the base 80 has a generally horizontal configuration and the first and second support arms 82, 86 are oriented generally perpendicular to the base 80; however, embodiments where the support arms 82, 86 extend at another angle are also contemplated herein. The base 80 may have a generally rectangular body, less than or equal in surface area to the projected surface area of the housing 24 in the second position. Alternatively, in an embodiment, a depth of the base 80 may vary over a width of the base 80. For example, as best shown in FIG. 6, a depth at the center of the base 80 is larger than the depth at the ends 84, 88 of the base 80. This increased depth may enhance the stability of the cooking system 20 when in the second stowed position.

As best shown in FIG. 8, each of the first support arm 82 and the second support arm 86 includes a pin connector 90 receivable within a corresponding opening 92 formed in a side, such as sidewalls 28 and 30 for example, of the housing 24. In the illustrated, non-limiting embodiment, the pin connectors 90 of the first support arm 82 and the second support arm 86, respectively, are coaxially oriented. Together, the pin connectors 90 cooperate to define the swivel axis S. The pin connectors 90 may directly contact an interior surface of the opening 92, or alternatively, a bearing (not shown) may be located at the interface between the pin connector 90 and the opening 92 to facilitate movement of the housing 24 relative to the pin connectors 90. In an embodiment, the pin connectors 90 and/or the openings 92 may be configured to restrict rotation of the housing 24 about the swivel axis S beyond the first position and the second position. However, the rotation of the housing 24 about the swivel axis S may be controlled or limited via any suitable mechanism.

In an embodiment, the pin connectors 90 are located near a distal end 94 of each of the first and second arms 82, 86. As a result, an adjacent surface of the housing 24, such as the bottom 34 of the housing 24 when in the first position, and the rear wall 36 of the housing 24 when in the second position, is offset from the base 80 and the support surface 22. This clearance 96 defined between the base 80 and the housing 24 allows the housing 24 to freely rotate about the swivel axis S without interference.

Figure 9:
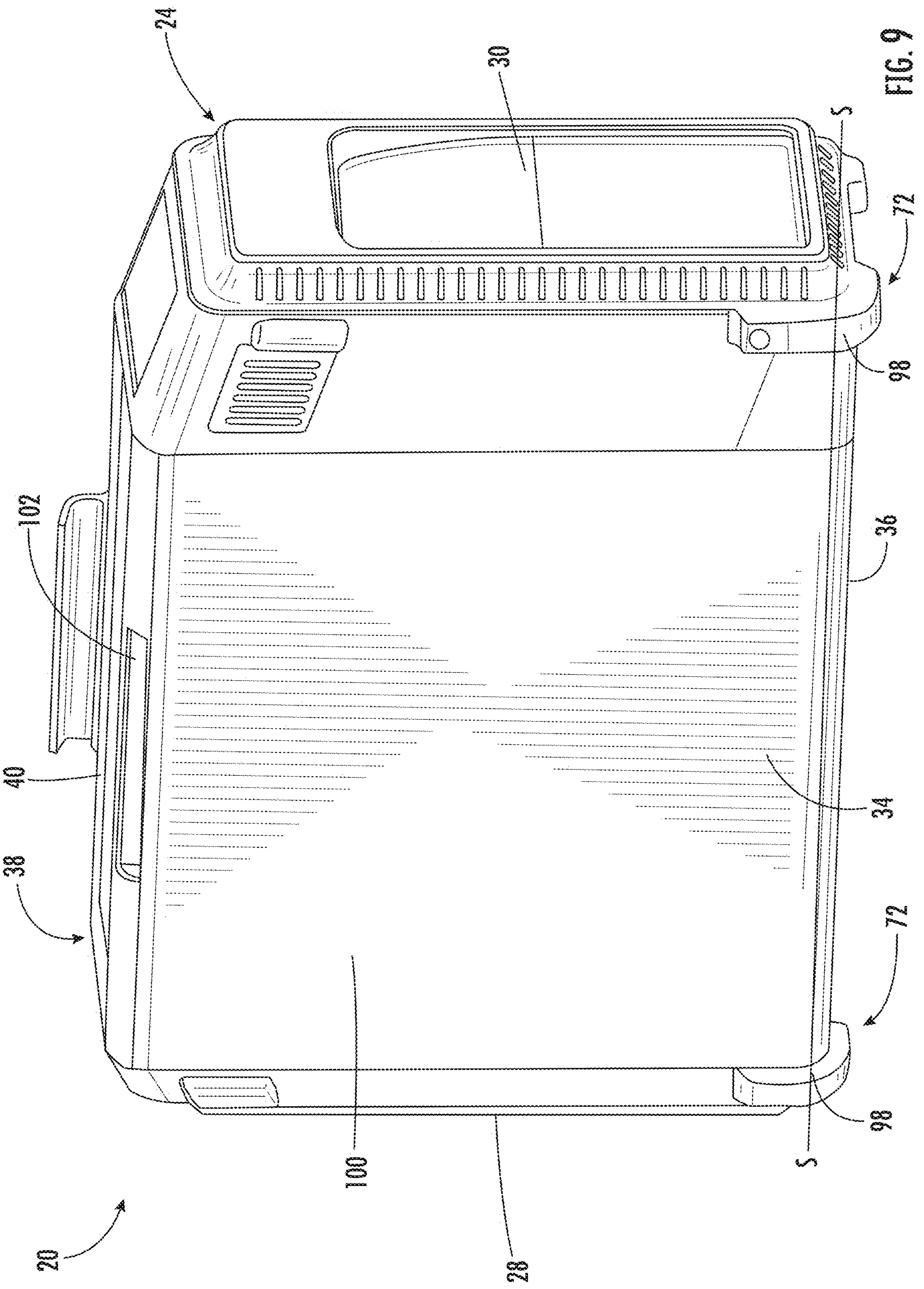
FIG. 9 is a perspective view of a cooking system in a second stowed configuration according to an embodiment.

In another embodiment, best shown in FIG. 9, the swivel support 70 may be a rounded feature arranged at an edge of the housing. However, the rounded feature of the swivel support 72 is distinct from the rounded edges of the housing. In an embodiment, the swivel support 72 includes one or more arcuate features 98, such as ribs for example, located at an exterior surface of the housing 24 and extending between the bottom 34 and the rear wall 36. The origin of each of the arcuate features 98 defines the swivel axis S and the contour of the arcuate features 98 facilitates rotation of the housing 24 by a user between the first position and the second position.

In an embodiment, the cooking system 20 may include a secondary door, distinct from the door 40 or opening 46 associated with the front wall 38 of the housing 24, for accessing the internal heating compartment 26. With continued reference to FIG. 9, and further reference to FIGS. 10-11, in an embodiment, a cleaning door 100 is formed in the housing 24, and more specifically, in the rear wall 36. The cleaning door 100 may extend over a portion of the rear wall 36, or alternatively, may cover a substantial entirety of the rear wall as shown in the FIGS.

Figure 10:
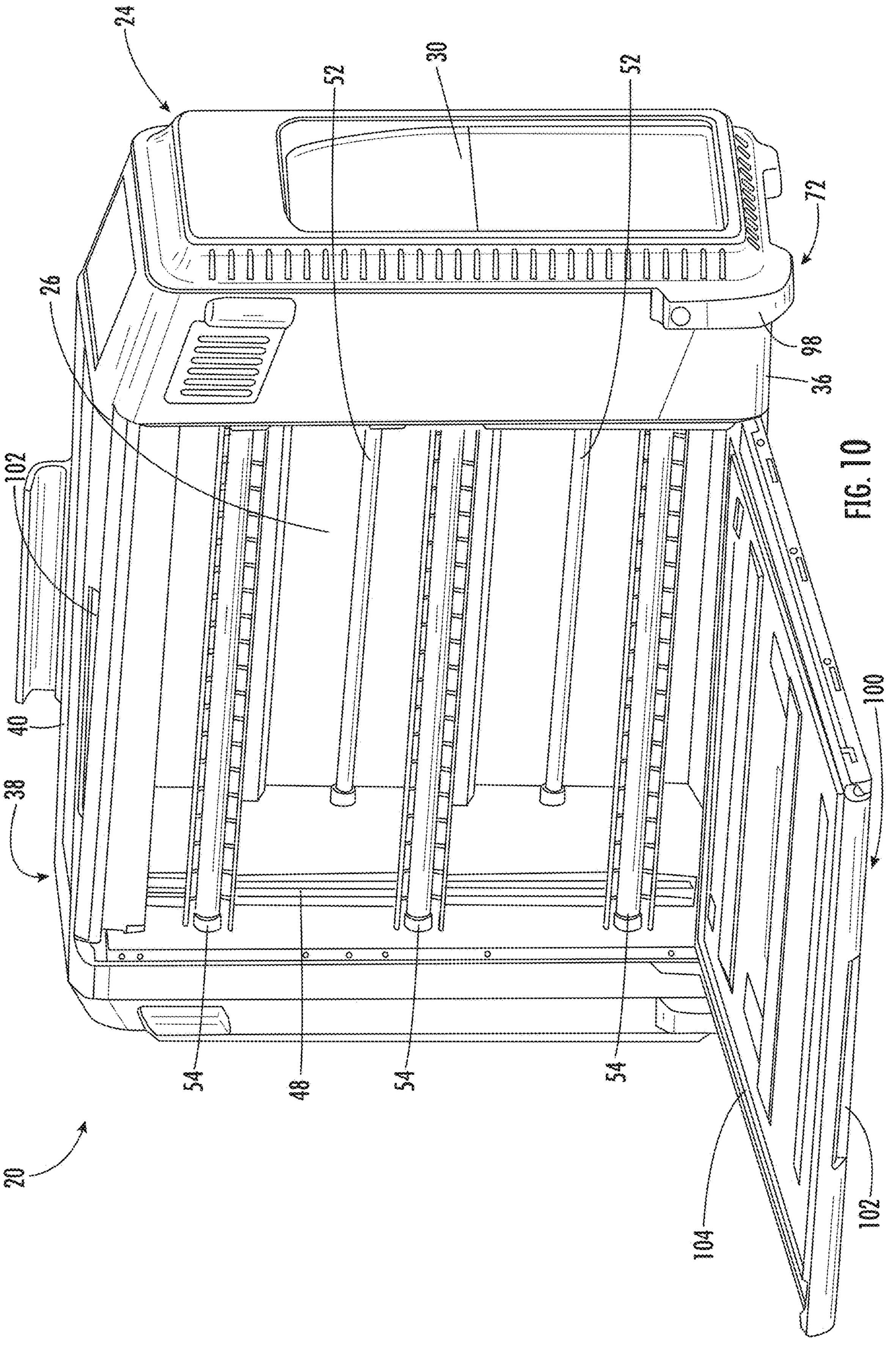
FIG. 10 is a perspective view of a cooking system in a second stowed configuration with a cleaning door in an open configuration according to an embodiment.

When the cooking system 20 is rotated relative to the first position, i.e. the bottom is not arranged parallel to and directly adjacent the support surface 22, the cleaning door 100 is movable between a closed position (FIG. 9) and an open position (FIG. 10). The cleaning door may be able to rotate, translate, separate, or any combination thereof to transform between the closed position and the open position. In an embodiment a latch mechanism, illustrated at least partially at 102, selectively couples the cleaning door 100 to the remainder of the housing 24. Upon application of a force to the latch mechanism, the cleaning door is decoupled from the housing 24 such that the cleaning door 100 is movable between to an open position. When the cleaning door is returned to the closed position, the latch mechanism may be configured to automatically engage and couple to the cleaning door, thereby restricting movement of the cleaning door relative to the housing.

Due to the increased size of the cleaning door relative to the door 40, a user is able to more easily access the internal heating compartment 26 via the cleaning door 100. As a result, removal of one or more components mounted within the internal heating compartment 26, such as a liner 104 positioned in overlapping arrangement with an interior of a portion of the housing 24 for example, is better performed via the cleaning door 100.

The cooking system 20 illustrated and described herein provides an enhanced user experience by reducing the total amount of counter space occupied by the cooking system when the cooking system is not in use.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed:

1. A cooking system comprising:

a housing having a front wall, first and second sidewalls, a top wall, a bottom wall, and a rear wall connected together to form an internal heating compartment configured to receive food therein, and an opening formed in the front wall of the housing for accessing the internal heating compartment;

a door hingedly coupled to the housing and configured to rotate between an open position and a closed position about a hinge axis extending along a bottom edge of the door to selectively provide access to the internal heating compartment, wherein the door defines a first portion of the front wall of the housing when the door is in the closed position;

a user interface located adjacent to a lateral side of the door, wherein the user interface defines a second portion of the front wall of the housing;

a first pair of support feet extending from the bottom wall of the housing adjacent the front wall; and a second pair of support feet extending between the bottom wall and the rear wall of the housing and including arcuate features with a contour defining a swivel axis which facilitates rotation of the housing by a user between a first position in which the bottom surface of the housing is arranged generally parallel to a support surface on which the cooking system is located, with the first pair of support feet and the second pair of support feet resting on the support surface, and a second position in which the rear surface of the housing is arranged generally parallel to the support surface, with the second pair of support feet resting on the support surface and the first pair of support feet elevated from the support surface.

2. The cooking system of claim 1, further comprising a third pair of feet extending from the rear wall of the housing, wherein the third pair of support feet are elevated from the support surface when the housing is in the first position, and are configured to rest on the support surface when the housing is in the second position.

3. The cooking system of claim 1, wherein the door includes a transparent panel.

4. The cooking system of claim 1, wherein the user interface includes a knob configured to control operations of the cooking system.

5. The cooking system of claim 1, wherein the swivel axis is located where the rear wall meets the bottom wall.

6. The cooking system of claim 1, wherein the arcuate features of the second pair of support feet are rounded features.

7. The cooking system of claim 1, wherein the opening is arranged within a first plane when the housing is in the first position and is arranged within a second plane when the housing is in the second position, the first plane and the second plane being distinct.

8. The cooking system of claim 1, wherein in the first position, the internal heating compartment is oriented generally horizontally, and a plane including the opening is oriented generally vertically, and wherein in the second position, the internal heating compartment is oriented generally vertically, and a plane including the first opening is oriented generally horizontally.

9. The cooking system of claim 1, wherein the user interface is configured to receive one or more inputs operable to initiate operation of the cooking system in a plurality of cooking modes comprising a toast mode, a bake mode, a broil mode, a grill mode, a warm mode, and a reheat mode.

10. The cooking system of claim 1, further comprising:

a plurality of heating elements provided in the internal heating compartment and configured to provide heat to the internal heating compartment during operation of the cooking system; and a fan provided in the internal heating compartment and operable circulate air or another fluid through the internal heating compartment.

11. The cooking system of claim 1, further comprising one or more removable cooking accessories configured to be removably received within the internal heating compartment, wherein the one or more cooking accessories include a rack, a basket, and a drip tray.

12. A cooking system comprising:

a housing having a front wall, first and second sidewalls, a top wall, a bottom wall, and a rear wall connected together to form an internal heating compartment configured to receive food therein, and an opening formed in the front wall of the housing for accessing the internal heating compartment;

a door hingedly coupled to the front wall and configured to rotate between an open position and a closed position about a hinge axis extending along a bottom edge of the opening to selectively provide access to the internal heating compartment, wherein the door defines a first portion of the front wall of the housing when the door is in the closed position;

a user interface located adjacent to a lateral side of the door, wherein the user interface defines a second portion of the front wall of the housing;

at least one first support foot extending from the rear wall of the housing; and at least one second support foot extending between the bottom wall and the rear wall of the housing, wherein the at least one second support foot includes an arcuate feature with a rounded contour which facilitates rotation of the housing by a user between an active position in which the bottom surface of the housing is arranged generally parallel to a support surface on which the cooking system is located, with the at least one first foot elevated from the support surface and the at least one second support foot resting on the support surface, and a stowed position in which the rear surface of the housing is arranged generally parallel to the support surface, with the at least one first support foot and the at least of second support foot resting on the support surface.

13. The cooking system of claim 12, further comprising at least one third support foot extending from the bottom wall of the housing, wherein the at least one third support foot is configured to rest on the support surface when the housing is in the active position, and wherein the at least one third support foot is elevated from the support surface when the housing is in the stowed position.

14. The cooking system of claim 12, wherein the door includes a transparent panel.

15. The cooking system of claim 12, wherein the user interface includes a knob configured to control operations of the cooking system.

16. The cooking system of claim 12, wherein the opening is arranged within a first plane when the housing is in the first position and is arranged within a second plane when the housing is in the second position, the first plane and the second plane being distinct.

17. The cooking system of claim 12, wherein in the first position, the internal heating compartment is oriented generally horizontally, and a plane including the opening is oriented generally vertically, and wherein in the second position, the internal heating compartment is oriented generally vertically, and a plane including the first opening is oriented generally horizontally.

18. The cooking system of claim 12, wherein the user interface is configured to receive one or more inputs operable to initiate operation of the cooking system in a plurality of cooking modes comprising a toast mode, a bake mode, a broil mode, a grill mode, a warm mode, and a reheat mode.

19. The cooking system of claim 12, further comprising:

a plurality of heating elements provided in the internal heating compartment and configured to provide heat to the internal heating compartment during operation of the cooking system; and a fan provided in the internal heating compartment and operable circulate air or another fluid through the internal heating compartment.

20. The cooking system of claim 12, further comprising one or more removable cooking accessories configured to be removably received within the internal heating compartment, wherein the one or more cooking accessories include a rack, a basket, and a drip tray.

* * * * *